(12) United States Patent
Kamei et al.

(10) Patent No.: US 12,197,086 B2
(45) Date of Patent: Jan. 14, 2025

(54) LIGHT ADJUSTMENT DEVICE AND LIGHT ADJUSTMENT DEVICE MANUFACTURING METHOD

(71) Applicant: Japan Display Inc., Tokyo (JP)

(72) Inventors: Yoshifumi Kamei, Tokyo (JP); Yoshikatsu Imazeki, Tokyo (JP); Yoichi Kamijo, Tokyo (JP); Koichi Miyasaka, Tokyo (JP); Shuichi Osawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/545,539

(22) Filed: Dec. 19, 2023

(65) Prior Publication Data

US 2024/0210762 A1   Jun. 27, 2024

(30) Foreign Application Priority Data

Dec. 27, 2022   (JP) ................................. 2022-210547

(51) Int. Cl.
| | |
|---|---|
| *G02F 1/1347* | (2006.01) |
| *G02F 1/1333* | (2006.01) |
| *G02F 1/1339* | (2006.01) |
| *G02F 1/1345* | (2006.01) |

(52) U.S. Cl.
CPC ...... *G02F 1/1339* (2013.01); *G02F 1/133334* (2021.01); *G02F 1/13452* (2013.01); *G02F 1/13458* (2013.01)

(58) Field of Classification Search
None
See application file for complete search history.

(56) References Cited

U.S. PATENT DOCUMENTS

2005/0190335 A1 *   9/2005   Maruyama ............ G02F 1/1339
349/153

FOREIGN PATENT DOCUMENTS

| JP | 2004-333567 A | 11/2004 | |
|---|---|---|---|
| WO | WO-2012086311 A1 * | 6/2012 | ............... G02B 3/14 |

* cited by examiner

*Primary Examiner* — Thanh Nhan P Nguyen
(74) *Attorney, Agent, or Firm* — K&L Gates LLP

(57) ABSTRACT

A light adjustment device includes a panel unit in which a plurality of light adjustment panels are stacked in a first direction, each of the light adjustment panels including a first substrate and a second substrate, the first substrate including a first terminal, the second substrate overlapping the first substrate and including a second terminal, a conductive member provided at an end part of the panel unit in a second direction intersecting the first direction, the conductive member extending in the first direction, and a sealing member disposed between the first substrate and the second substrate in each of the light adjustment panels and overlapping a coupling terminal including the first terminal and the second terminal when viewed in the first direction.

3 Claims, 24 Drawing Sheets

LIGHT ADJUSTMENT DEVICE AND LIGHT ADJUSTMENT DEVICE MANUFACTURING METHOD

CROSS-REFERENCE TO RELATED APPLICATION

This application claims the benefit of priority from Japanese Patent Application No. 2022-210547 filed on Dec. 27, 2022, the entire contents of which are incorporated herein by reference.

BACKGROUND

1. Technical Field

The present disclosure relates to a light adjustment device and a light adjustment device manufacturing method.

2. Description of the Related Art

A light adjustment device of Japanese Patent Application Laid-open Publication No. 2004-333567 includes a plurality of light adjustment panels that are stacked. Each of the light adjustment panels includes, for example, a first substrate, a second substrate, and a liquid crystal layer encapsulated between the substrates. When incident light enters a light adjustment panel, the light transmittance of the incident light is adjusted in the light adjustment panel and this adjusted transmitted light is output from the light adjustment device. In each of the light adjustment panel, the first substrate on the lower side and the second substrate on the upper side are stacked in the up-down direction. The first substrate and the second substrate are each provided with a terminal. External coupling wires of a flexible printed board or the like are coupled to each of the terminal of the first substrate and the terminal of the second substrate in one light adjustment panel. In other words, the two external coupling wires are coupled to the one light adjustment panels.

It is desired to reduce the number of external coupling wires included in a light adjustment device.

The present disclosure is made in view of the above-described problem and intended to provide a light adjustment device and a light adjustment device manufacturing method with which the number of external coupling wires coupled to terminals of a substrate can be reduced.

SUMMARY

A light adjustment device according to an embodiment of the present disclosure includes a panel unit in which a plurality of light adjustment panels are stacked in a first direction, each of the light adjustment panels including a first substrate and a second substrate, the first substrate including a first terminal, the second substrate overlapping the first substrate and including a second terminal, a conductive member provided at an end part of the panel unit in a second direction intersecting the first direction, the conductive member extending in the first direction, and a sealing member disposed between the first substrate and the second substrate in each of the light adjustment panels and overlapping a coupling terminal including the first terminal and the second terminal when viewed in the first direction. The conductive member includes a body portion continuously extending in the first direction, and an insertion portion protruding from the body portion in the second direction, inserted between the first substrate and the second substrate in each of the light adjustment panels, and electrically coupled to the coupling terminal, and a distal end of the insertion portion contacts the sealing member.

A light adjustment device manufacturing method according to an embodiment of manufacturing a light adjustment device by using an ultraviolet shielding member having an ultraviolet shielding ratio equal to or higher than a first shielding ratio and an ultraviolet curable resin that is cured through ultraviolet irradiation is disclosed. The light adjustment device includes a panel unit in which a plurality of light adjustment panels are stacked in a first direction, each of the light adjustment panels including a first substrate and a second substrate, the first substrate including a first terminal, the second substrate overlapping the first substrate and including a second terminal; a conductive member provided at an end part of the panel unit in a second direction intersecting the first direction, the conductive member extending in the first direction; and a sealing member disposed between the first substrate and the second substrate in each of the light adjustment panels and overlapping a coupling terminal including the first terminal and the second terminal when viewed in the first direction, the conductive member including a body portion continuously extending in the first direction and an insertion portion protruding from the body portion in the second direction, inserted between the first substrate and the second substrate in each of the light adjustment panels, and electrically coupled to the coupling terminal, a distal end of the insertion portion contacting the sealing member. The light adjustment device manufacturing method includes when a first site is a site at an end part of the panel unit in the second direction, the first site overlapping the coupling terminal when viewed in the first direction, a first step of providing the ultraviolet curable resin and the ultraviolet shielding member in the first direction at the first site, the ultraviolet shielding member overlapping the first substrate and the second substrate when viewed in the second direction, and inserting an insertion resin portion as part of the ultraviolet curable resin between the first substrate and the second substrate in each of the light adjustment panels, a second step of irradiating, after the first step, the ultraviolet curable resin with ultraviolet in the second direction to cure the ultraviolet curable resin, a third step of removing, after the second step, the ultraviolet curable resin and the ultraviolet shielding member from the panel unit while part of the insertion resin portion on a distal end side is left as the sealing member, and a fourth step of providing, after the third step, the conductive member in the first direction at the first site of the panel unit, bringing the distal end of the insertion portion as part of the conductive member into contact with the sealing member between the first substrate and the second substrate in each of the light adjustment panels, and electrically coupling the insertion portion to the coupling terminal.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

First Embodiment

Configuration of Light Adjustment Device

Figure 1:
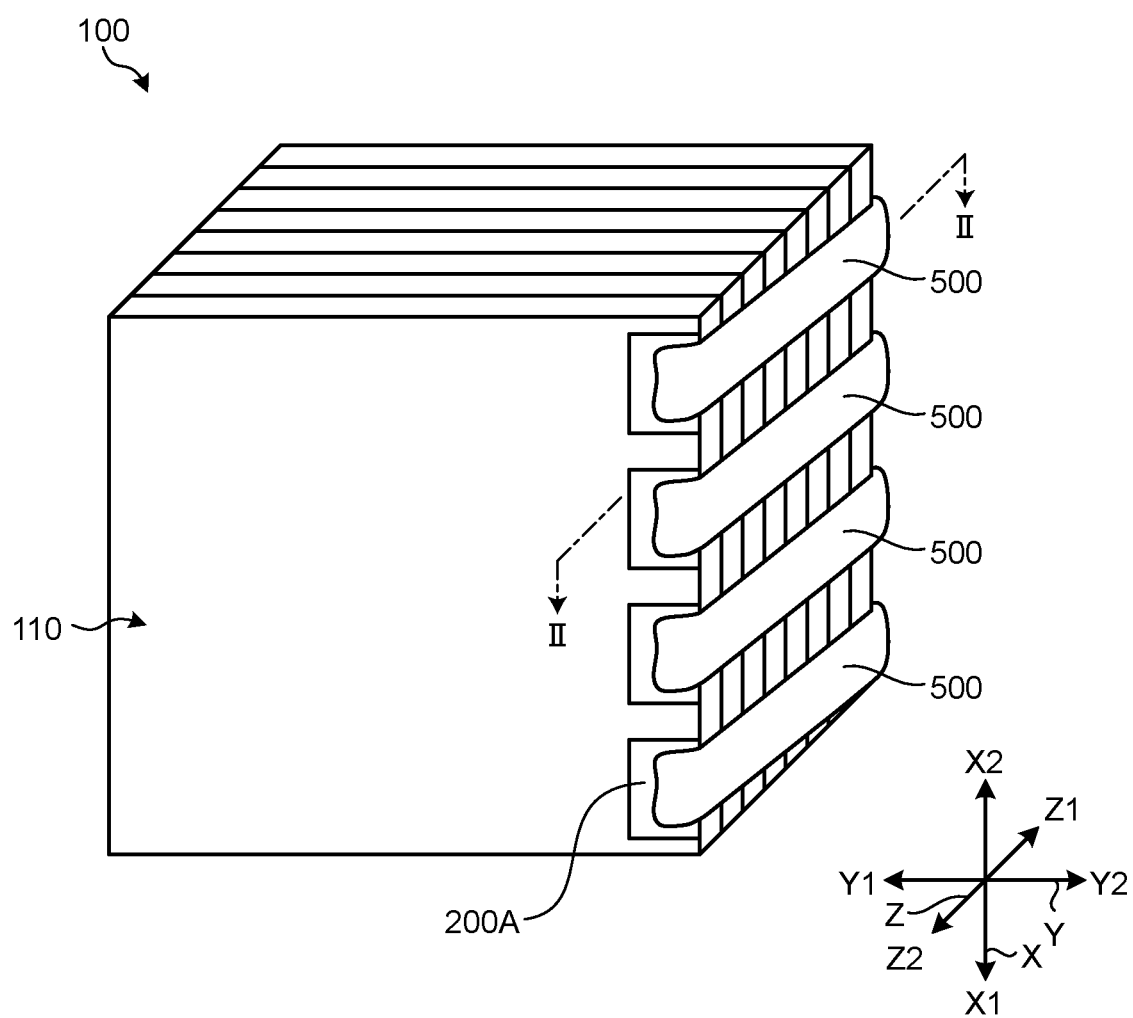
FIG. 1 is a perspective view schematically illustrating a light adjustment device according to a first embodiment.
Figure 2:
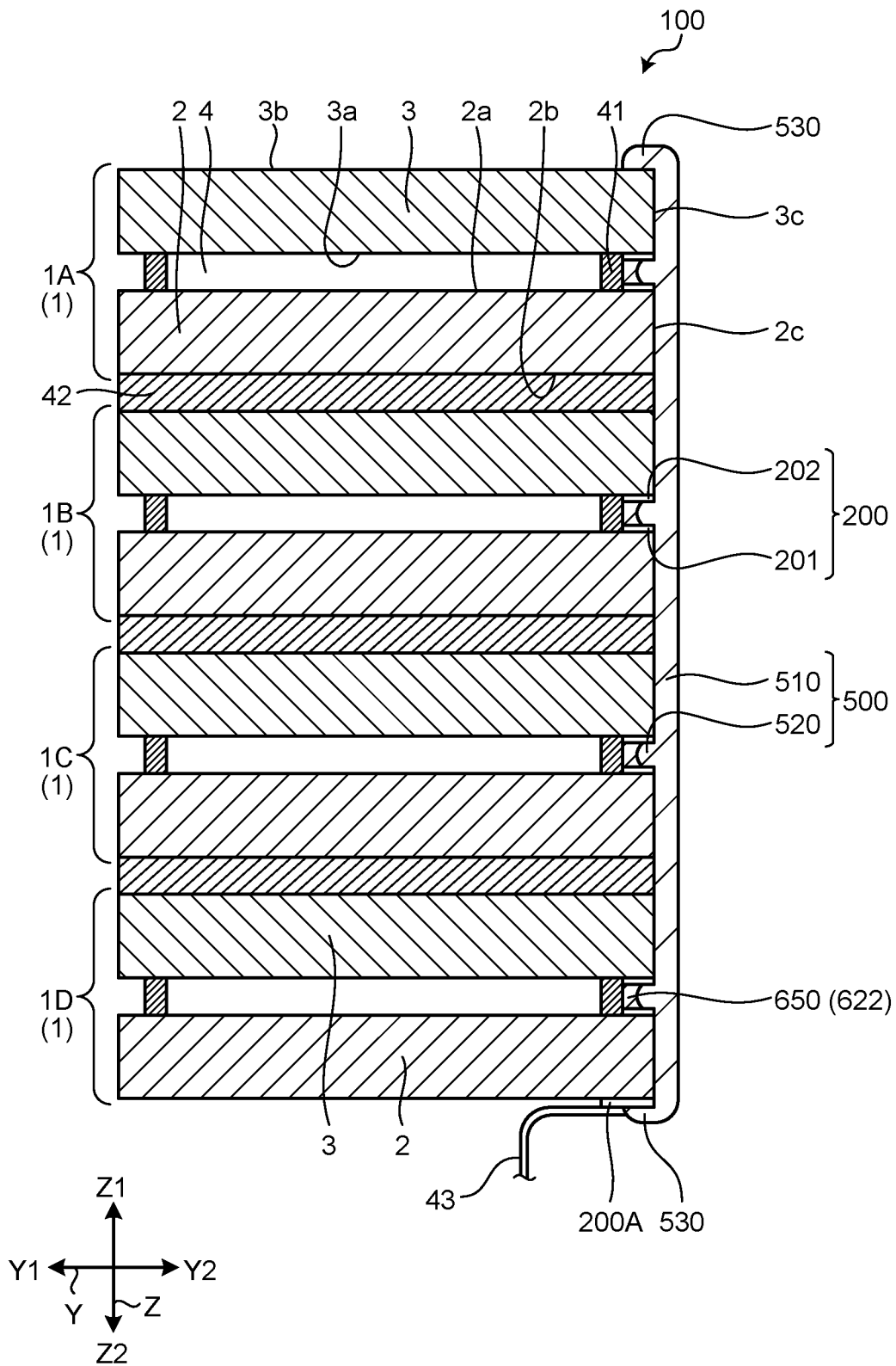
FIG. 2 is a sectional view along line II-II in FIG. 1.
Figure 3:
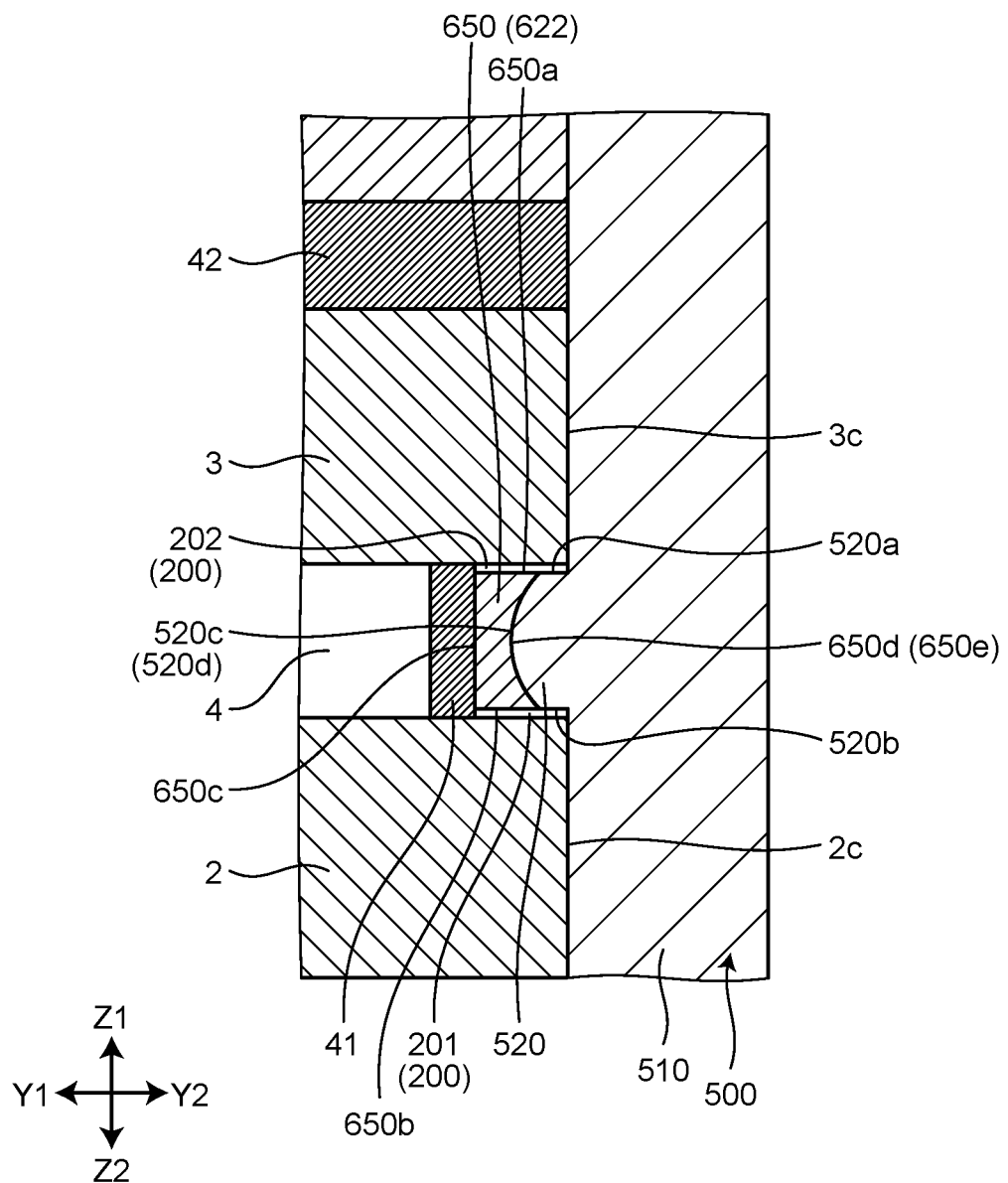
FIG. 3 is an enlarged view of part of FIG. 2.

The following first describes the configuration of a light adjustment device according to a first embodiment. FIG. 1 is a perspective view schematically illustrating the light adjustment device according to the first embodiment. FIG. 2 is a sectional view taken along line II-II in FIG. 1. FIG. 3 is an enlarged view of part of FIG. 2.

In an XYZ coordinate system illustrated in the drawings, an X direction is the front-back direction, and an X1 side is opposite an X2 side. The X1 side is also referred to as a front side, and the X2 side is also referred to as a back side. A Y direction is the right-left direction, and a Y1 side is opposite a Y2 side. The Y1 side is also referred to as a left side, and the Y2 side is also referred to as a right side. A Z direction is the up-down direction (stacking direction). A Z1 side is opposite a Z2 side. The Z1 side is also referred to as an upper side, and the Z2 side is also referred to as a lower side. The Z direction is also referred to as a first direction, and the Y direction is also referred to as a second direction.

As illustrated in FIGS. 1 and 2, a light adjustment device 100 according to the first embodiment includes a panel unit 110, a conductive member 500, a sealing member 650, and an external coupling wire 43. An external coupling wire 400 is, for example, a conductive wire.

As illustrated in FIGS. 1 and 2, in the present embodiment, the panel unit 110 is formed by stacking a plurality (in the embodiment, four) of light adjustment panels 1 in the Z direction (first direction). Light adjustment panels 1 adjacent to each other in the up-down direction are joined together through a translucent bonding agent 42. The light adjustment panel 1 is a square in the present embodiment, but the present invention is not limited thereto and the light adjustment panel 1 may be a polygon such as a pentagon.

Specifically, as illustrated in FIG. 2, the four light adjustment panels 1 are light adjustment panels 1A, 1B, 1C, and 1D stacked in order from the upper side. Each of the light adjustment panels 1 includes a first substrate 2 disposed on the lower side (Z2 side), a second substrate 3 disposed on the upper side (Z1 side), a seal 41 provided between the first substrate 2 and the second substrate 3, a liquid crystal layer 4 filling inside the seal 41, a first terminal 201, and a second terminal 202.

The first substrate 2 and the second substrate 3 have equal sizes when viewed in the Z direction. A front surface 2a of the first substrate 2 and a front surface 3a of the second substrate 3 face each other with the liquid crystal layer 4 interposed therebetween. Specifically, the front surface 2a of the first substrate 2 and the front surface 3a of the second substrate 3 are separated from each other in the Z direction with a space formed therebetween, and the liquid crystal layer 4 fills the space. The liquid crystal layer 4 is disposed inside the seal 41 having an annular shape. The inside of the seal 41 is an effective region. A back surface 2b of the first substrate 2 is a surface opposite the front surface 2a. A back surface 3b of the second substrate 3 is a surface opposite the front surface 3a. The first terminal 201 is provided on the first substrate 2. The second terminal 202 is provided on the second substrate 3. The second substrate 3 overlaps on the upper side of the first substrate 2. The first terminal 201 and the second terminal 202 are collectively referred to as a coupling terminal 200.

The conductive member 500 extends in the up-down direction (Z direction) at a side part (end part in the Y direction) of the panel unit 110. The conductive member 500 is formed by, for example, applying and curing paste containing a conductive material such as silver (Ag) or carbon (C).

As illustrated in FIG. 3, the sealing member 650 is provided outside the seal 41. The sealing member 650 includes a first surface 650a, a second surface 650b, a third surface 650c, and a fourth surface 650d. The first surface 650a is disposed, for example, on the lower side of the second terminal 202. Specifically, for example, the first surface 650a overlaps the second terminal 202 when viewed in the Z direction. The second surface 650b is disposed, for example, on the upper side of the first terminal 201. Specifically, for example, the second surface 650b overlaps the first terminal 201 when viewed in the Z direction. For example, the third surface 650c contacts an outer surface of the seal 41 in the first embodiment but may be separated from the outer surface of the seal 41. The fourth surface 650d includes a concave surface 650e that is concave toward a central part of the panel unit 110 when viewed in the Z direction. The concave surface 650e has a section in a circular arc shape that is concave on the Y1 side in FIG. 3.

As illustrated in FIG. 3, the conductive member 500 includes a body portion 510 and an insertion portion 520. The body portion 510 continuously extends in the Z direction. The insertion portion 520 protrudes inward in the Y direction from the body portion 510. Specifically, the insertion portion 520 is inserted between the first substrate 2 and the second substrate 3 in each of the light adjustment panels 1 and electrically coupled to the coupling terminal 200. The insertion portion 520 includes a first surface 520a, a second surface 520b, and a third surface 520c. The first surface 520a extends along a lower surface of the second terminal 202. The second surface 520b extends along an upper surface of the first terminal 201. The third surface 520c is a convex surface contacting the concave surface 650e. In other words, the third surface 520c is a distal end 520d having a section in a circular arc shape that is convex on the Y1 side in FIG. 3. Accordingly, the distal end 520d of the insertion portion 520 contacts the sealing member 650.

As illustrated in FIG. 2, end parts of the conductive member 500 on the Z1 and Z2 sides, respectively, are bending parts 530. For example, a terminal 200A is provided on a lower surface of the first substrate 2 of the light adjustment panel 1D positioned lowermost and the external coupling wire 43 is electrically coupled to the terminal 200A.

Figure 4:
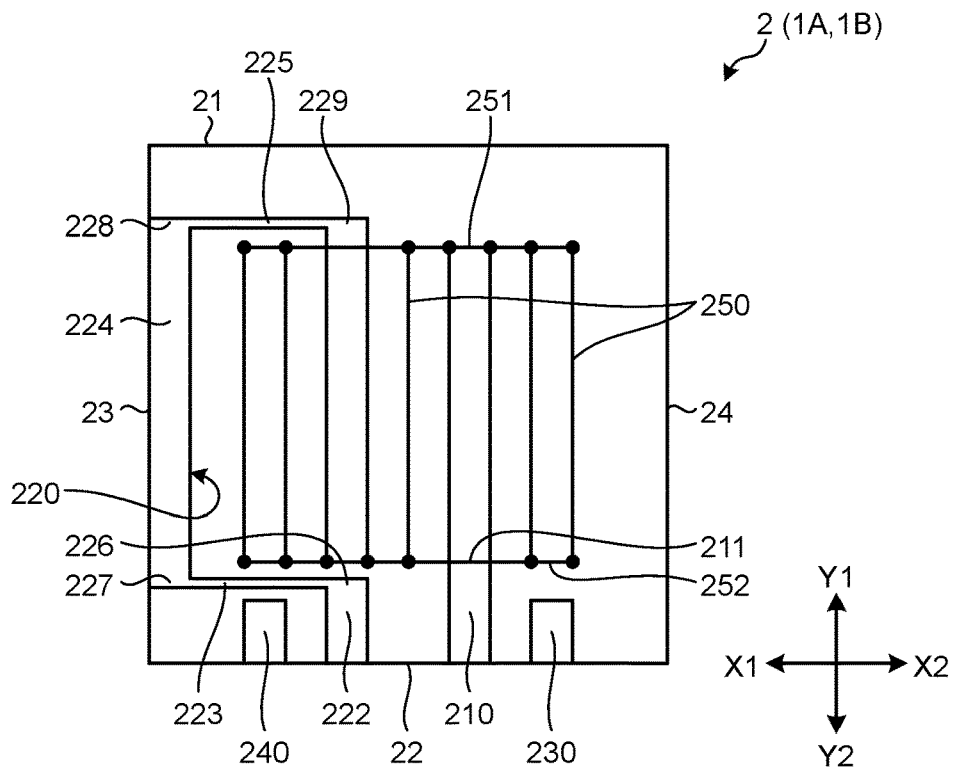
FIG. 4 is a plan view of a first substrate in each of the uppermost light adjustment panel and the second uppermost light adjustment panel illustrated in FIG. 2.
Figure 5:
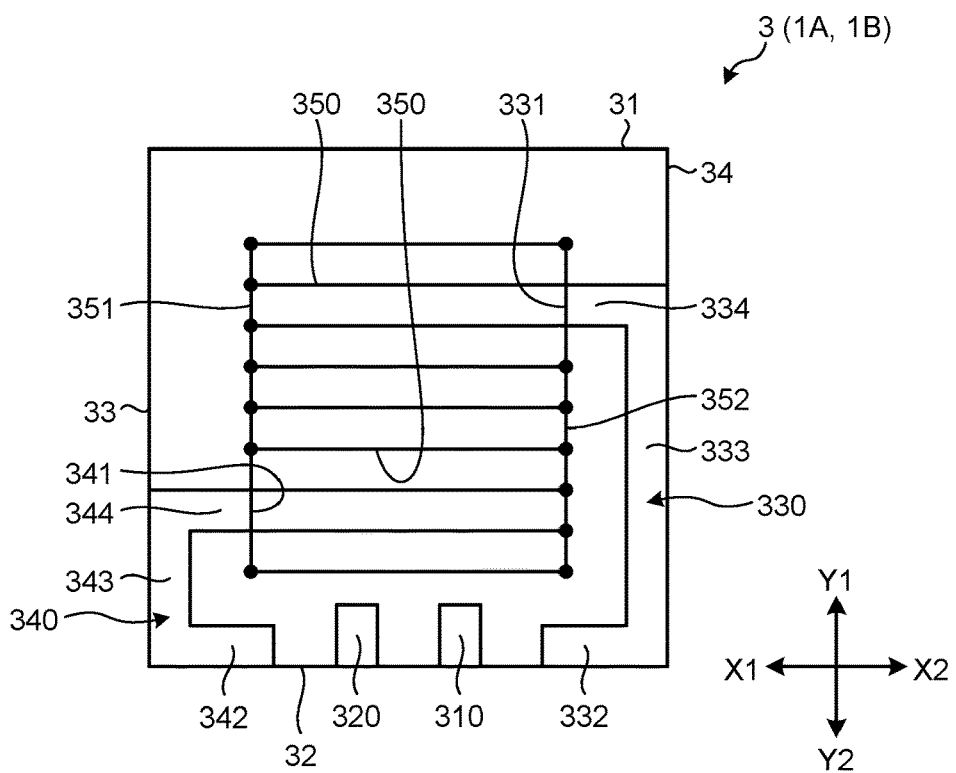
FIG. 5 is a plan view of a second substrate in each of the uppermost light adjustment panel and the second uppermost light adjustment panel illustrated in FIG. 2.
Figure 6:
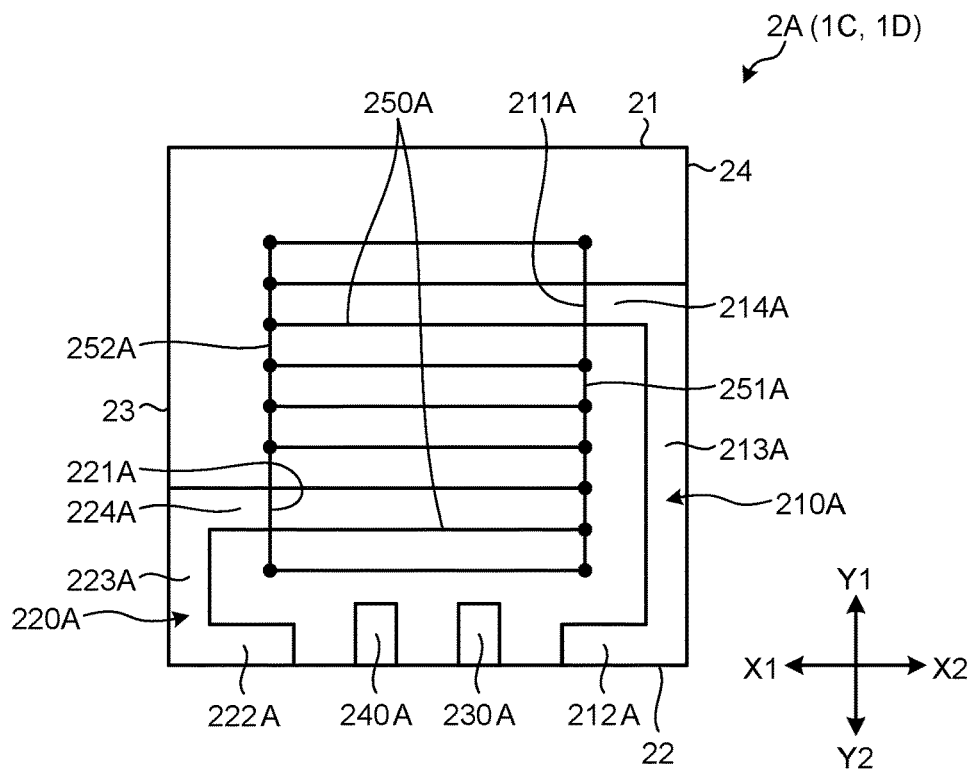
FIG. 6 is a plan view of a first substrate in each of the third uppermost light adjustment panel and the fourth uppermost light adjustment panel illustrated in FIG. 2.
Figure 7:
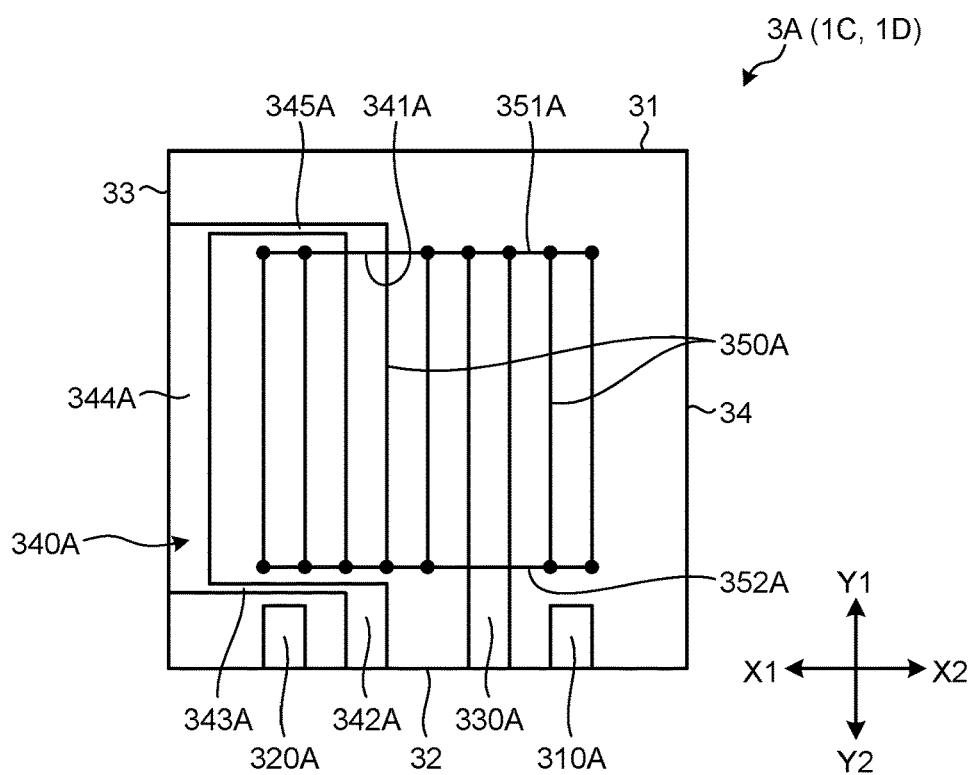
FIG. 7 is a plan view of a second substrate in each of the third uppermost light adjustment panel and the fourth uppermost light adjustment panel illustrated in FIG. 2.

FIG. 4 is a plan view of the first substrate in each of the uppermost light adjustment panel and the second uppermost light adjustment panel illustrated in FIG. 2. FIG. 5 is a plan view of the second substrate in each of the uppermost light adjustment panel and the second uppermost light adjustment panel illustrated in FIG. 2. FIG. 6 is a plan view of the first substrate in each of the third uppermost light adjustment panel and the fourth uppermost light adjustment panel illustrated in FIG. 2. FIG. 7 is a plan view of the second substrate in each of the third uppermost light adjustment panel and the fourth uppermost light adjustment panel illustrated in FIG. 2.

As illustrated in FIG. 4, the first substrate 2 in each of the light adjustment panels 1A and 1B includes first terminals 210, 220, 230, and 240 and liquid crystal drive electrodes 250. A first side 21 is positioned on the Y1 side. A second side 22 is positioned on the Y2 side. A third side 23 is positioned on the X1 side. A fourth side 24 is positioned on the X2 side.

The first terminal 210 is provided on the second side 22. An end 211 of the first terminal 210 is coupled to a wire 252. A first terminal 220 includes straight parts 222, 223, 224, and 225. The straight part 222 extends from the second side 22 to an end 226. The straight part 223 extends form the end 226 to an end 227. The straight part 224 extends from the end 227 to an end 228. The straight part 225 extends from the end 228 to an end 229. The end 229 is coupled to a wire 251. The liquid crystal drive electrodes 250 are coupled to the wires 251 and 252.

The first terminal 230 is provided on the second side 22. The first terminal 230 is positioned on the X2 side of the first terminal 210. The first terminal 240 is provided on the second side 22. The first terminal 240 is positioned on the X1 side of the straight part 222.

The first terminal 230, the first terminal 210, the straight part 222 of the first terminal 220, and the first terminal 240 are arranged on the second side 22 of the first substrate 2 in order from the X2 side toward the X1 side.

As illustrated in FIG. 5, the second substrate 3 in each of the light adjustment panels 1A and 1B includes second terminals 310, 320, 330, and 340 and liquid crystal drive electrodes 350. A first side 31 of the second substrate 3 is positioned on the Y1 side. A second side 32 is positioned on the Y2 side. A third side 33 is positioned on the X1 side. A fourth side 34 is positioned on the X2 side.

The first side 31 is positioned on the Y1 side. The second side 32 is positioned on the Y2 side. The third side 33 is positioned on the X1 side. The fourth side 34 is positioned on the X2 side. The second terminals 310 and 320 are provided on the second side 32. The second terminal 310 is disposed on the X2 side of the second terminal 320.

The second terminal 330 includes straight parts 332, 333, and 334. The straight part 332 extends along the second side 32. The straight part 333 extends along the fourth side 34. The straight part 334 includes an end 331, and the end 331 is coupled to a wire 352.

The second terminal 340 includes straight parts 342, 343, and 344. The straight part 342 extends along the second side 32. The straight part 343 extends along the third side 33. The straight part 344 has an end 341, and the end 341 is coupled to a wire 351. The liquid crystal drive electrodes 350 are coupled to the wires 351 and 352.

The following describes the light adjustment panels 1C and 1D. The positions of terminals, wires, and liquid crystal drive electrodes of the first substrate in each of the light adjustment panels 1C and 1D coincide with the positions of terminals, wires, and liquid crystal drive electrodes of the second substrate in each of the light adjustment panels 1A and 1B when viewed from above. In other words, the positions of terminals, wires, and liquid crystal drive electrodes are the same between a first substrate 2A illustrated in FIG. 6 and the second substrate 3 illustrated in FIG. 5. Moreover, the positions of terminals, wires, and liquid crystal drive electrodes are the same between a second substrate 3A illustrated in FIG. 7 and the first substrate 2 illustrated in FIG. 4. Specific description is given below.

As illustrated in FIG. 6, the first substrate 2A in each of the light adjustment panels 1C and 1D includes first terminals 210A, 220A, 230A, and 240A and liquid crystal drive electrodes 250A. The first side 21 is positioned on the Y1 side. The second side 22 is positioned on the Y2 side. The third side 23 is positioned on the X1 side. The fourth side 24 is positioned on the X2 side.

The first terminal 210A has straight parts 212A, 213A, and 214A. The straight part 212A extends along the second side 22. The straight part 213A extends along the fourth side 24. The straight part 214A has an end 211A, and the end 211A is coupled to a wire 251A.

The first terminal 220A has straight parts 222A, 223A, and 224A. The straight part 222A extends along the second side 22. The straight part 223A extends along the third side 23. The straight part 224A has an end 221A, and the end 221A is coupled to a wire 252A.

The first terminals 230A and 240A are provided on the second side 22. The first terminal 230A is positioned on the X2 side of the first terminal 240A. The wires 251A and 252A are coupled to the liquid crystal drive electrodes 250A.

As illustrated in FIG. 7, the second substrate 3A in each of the light adjustment panels 1C and 1D includes second terminals 310A, 320A, 330A, and 340A and liquid crystal drive electrodes 350A. The second terminals 310A and 320A are provided on the second side 32. The second terminal 310A is positioned on the X2 side of the second terminal 320A. The second terminal 330A is provided on the second side 32. The second terminal 330A is coupled to a wire 352A.

The second terminal 340A has straight parts 342A, 343A, 344A, and 345A. The straight part 342A is provided on the second side 32. The straight part 343A extends on the X1 side from a distal end of the straight part 342A. The straight part 344A extends along the third side 33. The straight part 345A extends in the X direction and has an end 341A coupled to a wire 351A. The wires 351A and 352A are coupled to the liquid crystal drive electrodes 350A.

Light Adjustment Device Manufacturing Method

Figure 8:
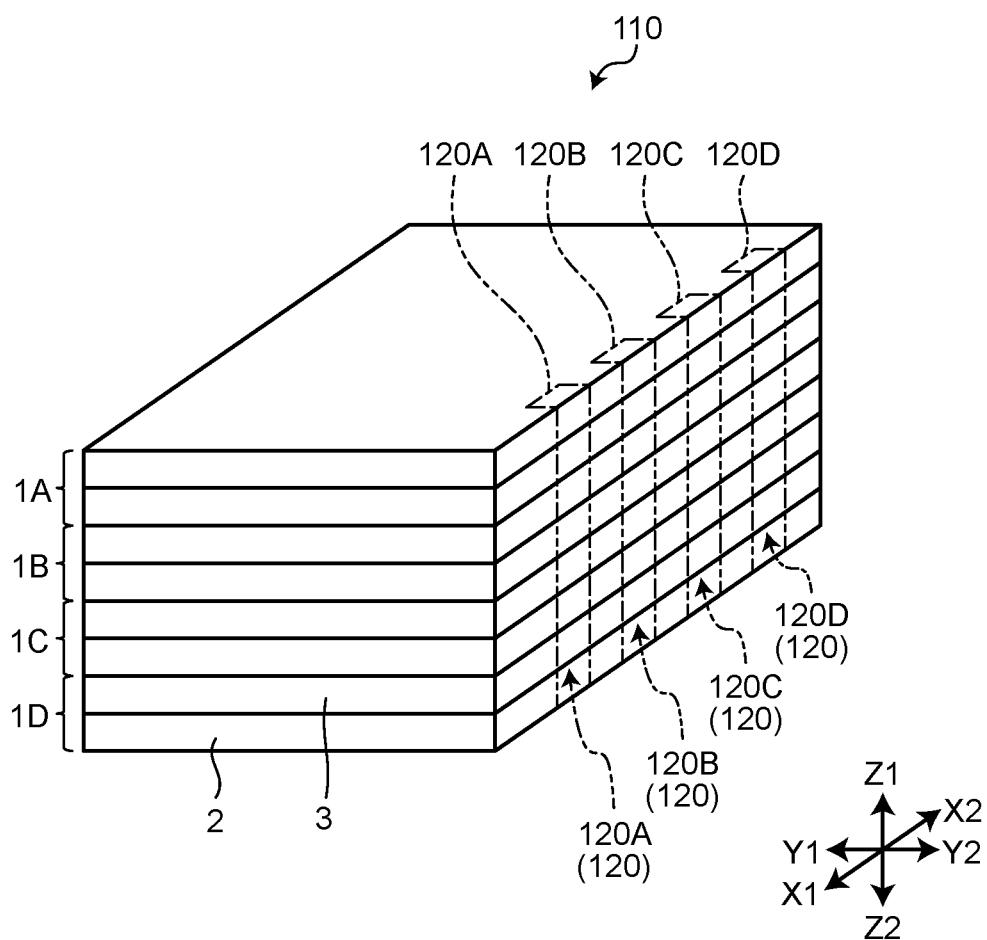
FIG. 8 is a perspective view schematically illustrating a panel unit.
Figure 9:
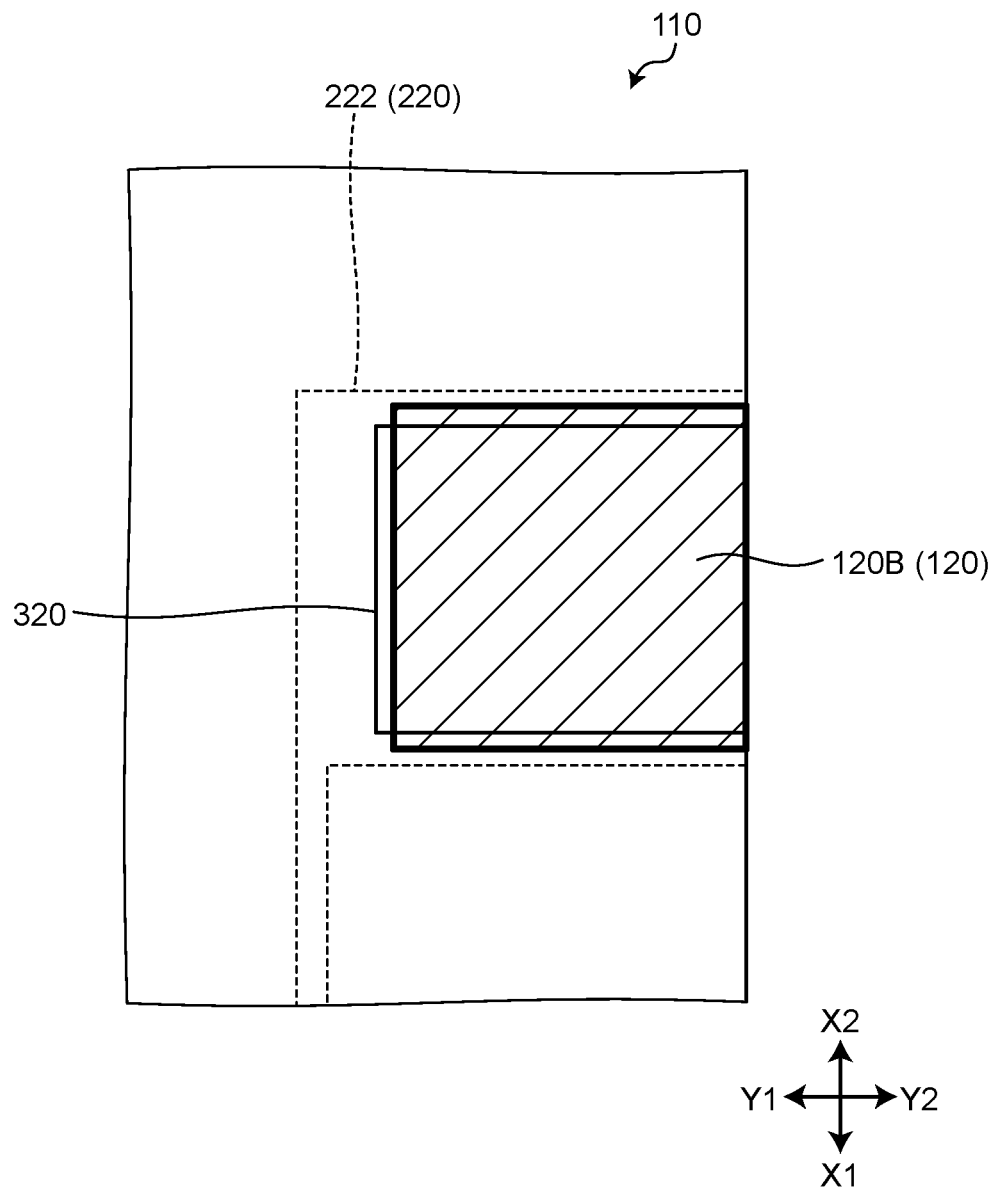
FIG. 9 is an enlarged schematic diagram of part of an upper surface of the panel unit in FIG. 8.
Figure 10:
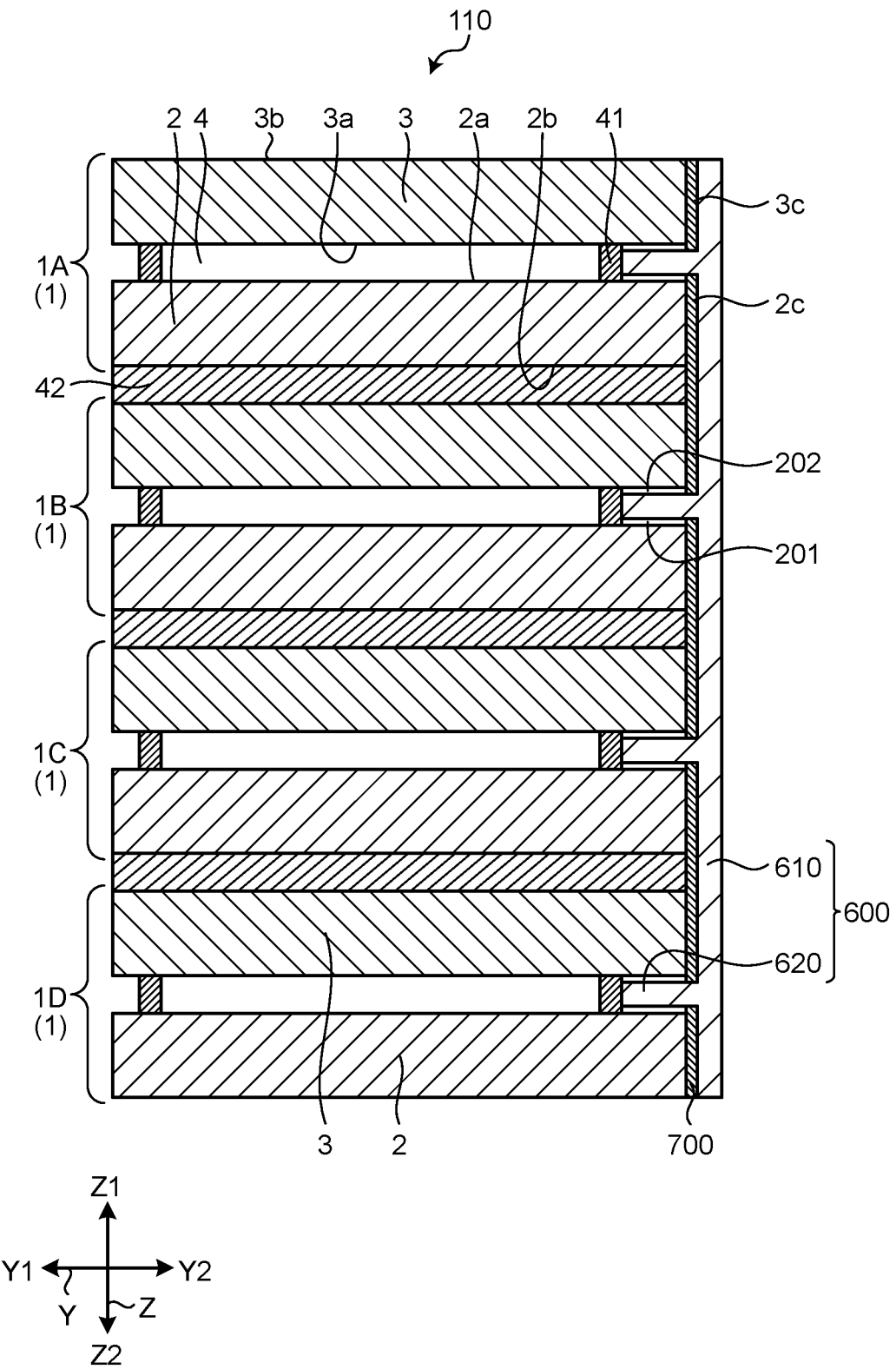
FIG. 10 is a sectional view illustrating a state in which an ultraviolet shielding member and an ultraviolet curable resin are provided on a side surface of the panel unit.
Figure 11:
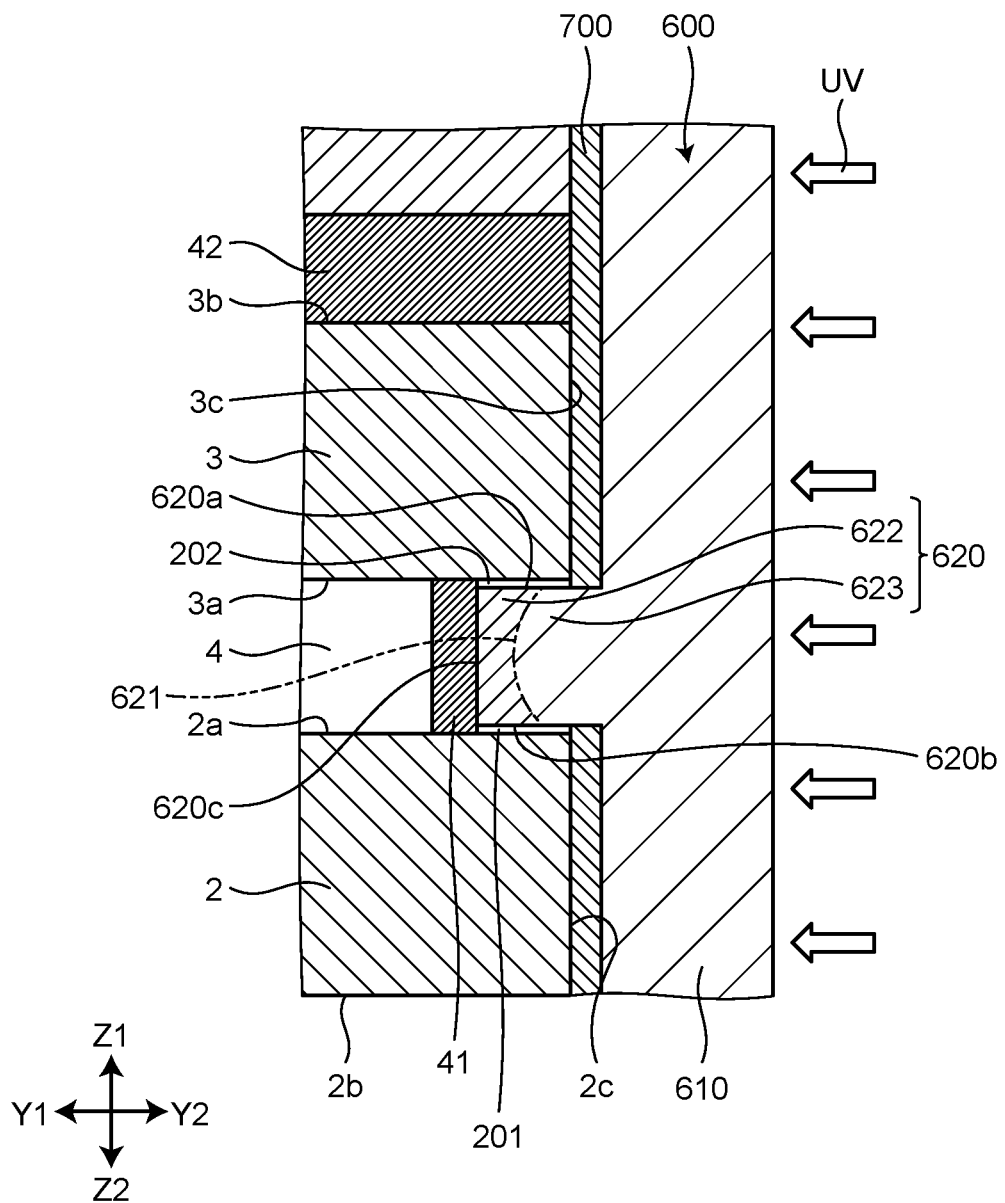
FIG. 11 is a sectional view illustrating a state in which the ultraviolet curable resin is irradiated with ultraviolet in a Y direction.
Figure 12:
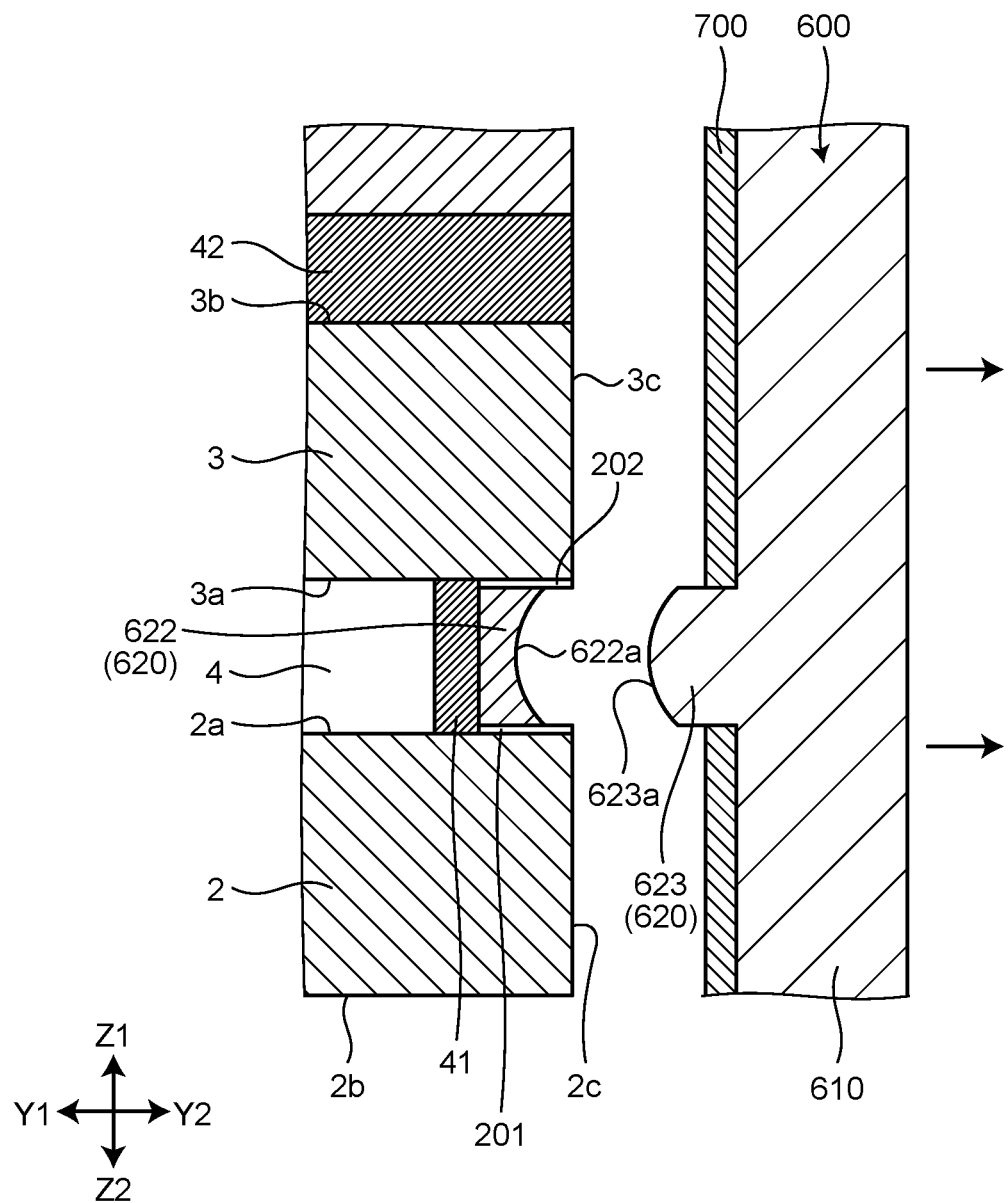
FIG. 12 is a sectional view illustrating a state in which the ultraviolet curable resin and the ultraviolet shielding member are removed from the panel unit.
Figure 13:
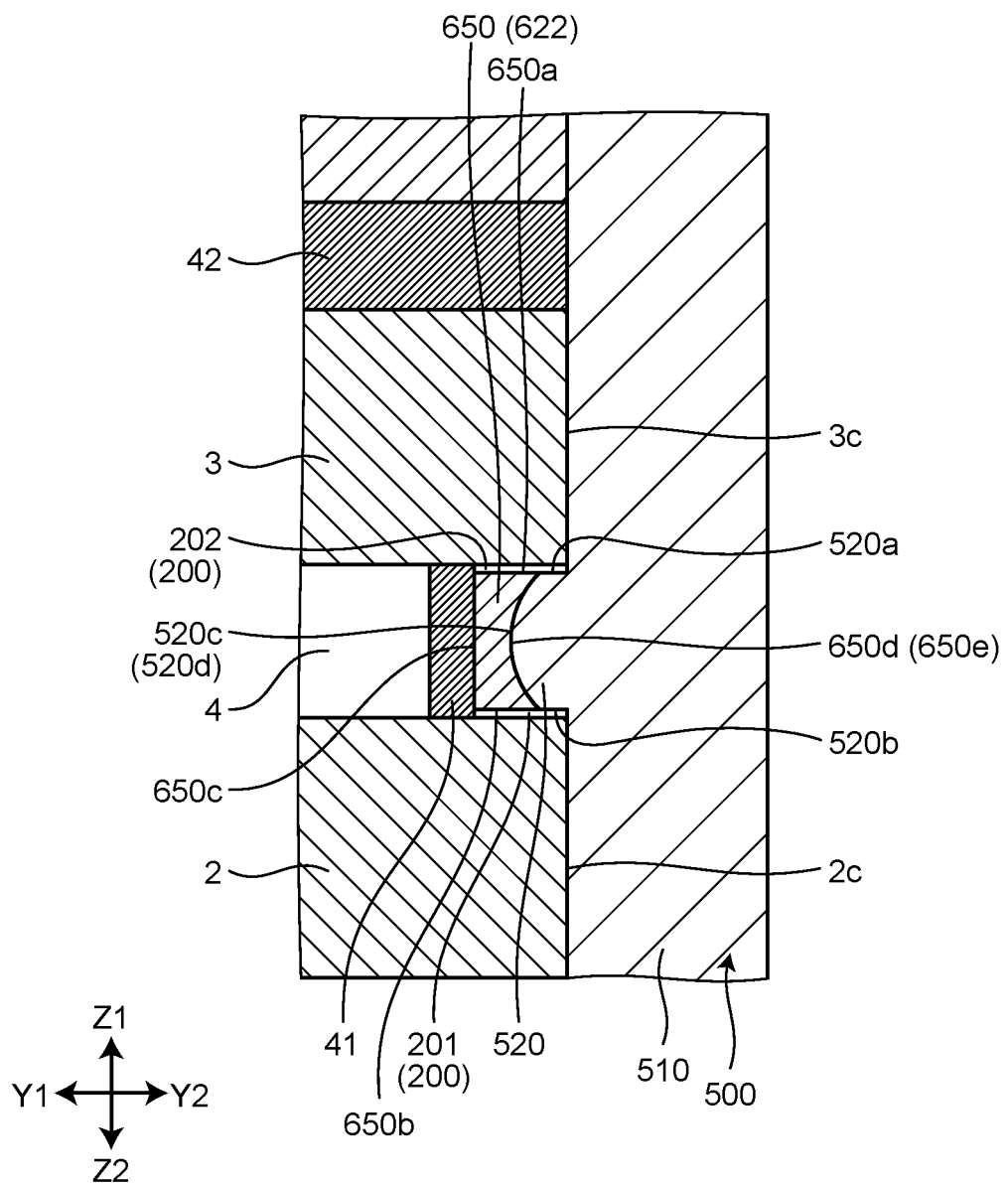
FIG. 13 is a sectional view of a light adjustment device completed by a method according to the first embodiment.

The following describes a light adjustment device manufacturing method. FIG. 8 is a perspective view schematically illustrating a panel unit. FIG. 9 is an enlarged schematic diagram of part of an upper surface of the panel unit in FIG. 8. FIG. 10 is a sectional view illustrating a state in which an ultraviolet shielding member and an ultraviolet curable resin are provided on a side surface of the panel unit. FIG. 11 is a sectional view illustrating a state in which the ultraviolet curable resin is irradiated with ultraviolet in the Y direction. FIG. 12 is a sectional view illustrating a state in which the ultraviolet curable resin and the ultraviolet shielding member are removed from the panel unit. FIG. 13 is a sectional view of a light adjustment device completed by the method according to the first embodiment.

The following first describes first sites 120 of the panel unit 110. As illustrated in FIG. 8, each of the first sites 120 is a site at an end part (end part in the Y direction) of the panel unit 110 on the Y2 side, overlapping the coupling terminal 200 when viewed in the Z direction (upper side). The second substrate 3 (refer to FIG. 5) of the light adjustment panel 1A is disposed uppermost in the panel unit 110, and the first substrate 2 of the light adjustment panel 1A (refer to FIG. 4) is disposed on the lower side of the second substrate 3 of the light adjustment panel 1A. Accordingly, as illustrated in FIG. 9, the straight part 222 of the first terminal 220 of the first substrate 2 in FIG. 4 overlaps on the lower side of the second terminal 320 of the second substrate 3 in FIG. 5. In this manner, the first site 120 is set as a site overlapping the first terminal 201 and the second terminal 202 when viewed from above in the present specification. Specifically, the first site 120 has a rectangular parallelepiped shape extending in the Z direction as illustrated in FIG. 8. The first site 120 is hatched in FIG. 9. Specifically, the first sites 120 include first sites 120A, 120B, 120C, and 120D. As illustrated in FIG. 8, the first sites 120A, 120B, 120C, and 120D are arranged in the stated order from the X1 side toward the X2 side.

The light adjustment device manufacturing method according to the first embodiment includes a first step, a second step, a third step, and a fourth step.

The first step is a process of providing an ultraviolet curable resin 600 and an ultraviolet shielding member 700 at the first site 120. Specifically, the ultraviolet shielding member 700 is bonded to side surfaces 2c of the first substrates 2 and side surfaces 3c of the second substrates 3 on the Y2 side as illustrated in FIGS. 10 and 11. That is, the ultraviolet shielding member 700 is joined to sites, each of the sites being other than between the first substrate 2 and the corresponding second substrate 3 in the Z direction. In other words, the ultraviolet shielding member 700, which overlaps the side surfaces 2c of the first substrates 2 and 3c of the respective first substrates 2 and the side surfaces of the second substrate 3 on the Y2 side when the panel unit 110 is viewed in the Y direction, is bonded to a side surface of the panel unit 110 on the Y2 side. The ultraviolet shielding member 700 is, for example, a sheet member having an ultraviolet UV shielding ratio equal to or larger than a first shielding ratio. The first shielding ratio is preferably, for example, 90% or higher.

In the first step, as illustrated in FIGS. 10 and 11, the ultraviolet curable resin 600 in a paste form is provided in the Z direction at the first site 120, and an insertion resin portion 620 as part of the ultraviolet curable resin 600 is inserted between the first substrate 2 and the second substrate 3 in each of the light adjustment panels 1. The ultraviolet curable resin 600 includes a body portion 610 and the insertion resin portion 620. The body portion 610 is applied on the ultraviolet shielding member 700. The insertion resin portion 620 protrudes on the Y1 side and is inserted between the first substrate 2 and the second substrate 3, and the insertion resin portion 620 contacts the first terminal 201 and the second terminal 202.

The second step after the first step is a process of irradiating the ultraviolet curable resin 600 with ultraviolet UV in the Y direction to cure the ultraviolet curable resin 600. As illustrated in FIG. 11, the ultraviolet curable resin 600 is irradiated with ultraviolet UV from the Y2 side to cure the entire ultraviolet curable resin 600 including the insertion resin portion 620.

The third step after the second step is a process of removing the ultraviolet curable resin 600 and the ultraviolet shielding member 700 from the panel unit 110 while part of the insertion resin portion 620 on the distal end side is left as the sealing member 650. As illustrated with dashed and double-dotted lines in FIG. 11, a separation boundary 621 is formed in the insertion resin portion 620. The separation boundary 621 has, for example, a circular arc shape that is convex on the Y1 side. After the irradiation with ultraviolet UV, difference in hardness occurs between a remaining part 622 and an inserted resin body 623. Accordingly, as illustrated in FIG. 12, when the ultraviolet curable resin 600 and the ultraviolet shielding member 700 are removed from the panel unit 110 toward the Y2 side as illustrated with arrows, cracks are generated at the separation boundary 621 between the remaining part 622 and the inserted resin body 623, and the insertion resin portion 620 is separated into the remaining part 622 and the inserted resin body 623. As a result, the remaining part 622 remains in the panel unit 110 and becomes the sealing member 650.

In the fourth step after the third step, the conductive member 500 is provided in the Z direction at the first site 120 of the panel unit 110, the distal end 520*d* of the insertion portion 520 as part of the conductive member 500 is brought into contact with the sealing member 650 between the first substrate 2 and the second substrate 3 in each of the light adjustment panels 1, and the insertion portion 520 is electrically coupled to the corresponding coupling terminal 200. As illustrated in FIG. 13, the conductive member 500 includes the body portion 510 and the insertion portions 520. The conductive member 500 is in a paste form, and accordingly, the distal end 520*d* of the insertion portion 520 is pressed against the concave surface 650*e* of the sealing member 650 and shaped along the concave surface 650*e*. Then, the light adjustment device 100 according to the present embodiment is completed when the conductive member 500 in a paste form is cured.

Modification

Figure 14:
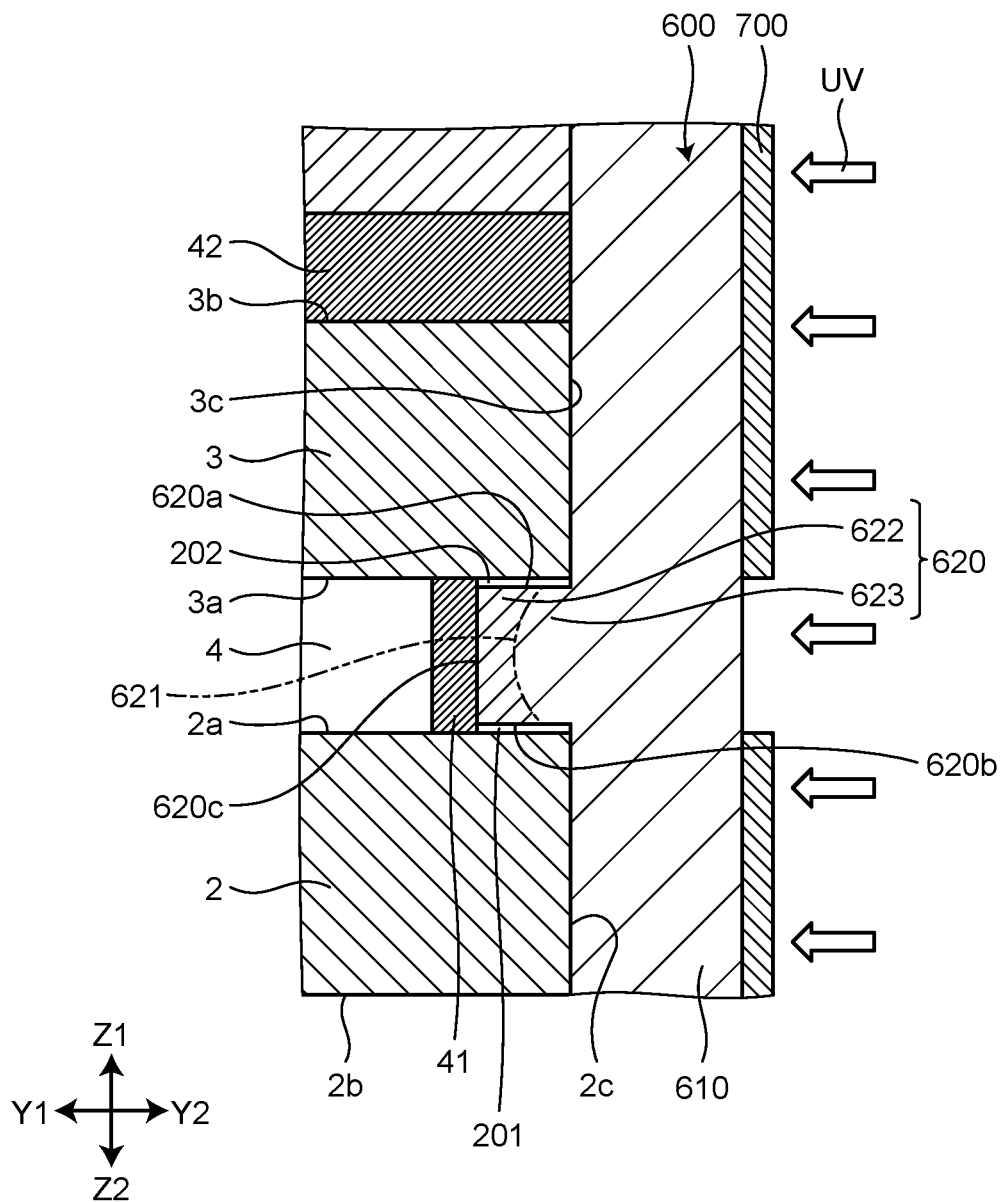
FIG. 14 is a diagram illustrating a modification of the first embodiment and is a sectional view illustrating a state in which the ultraviolet curable resin is irradiated with ultraviolet in the Y direction.
Figure 15:
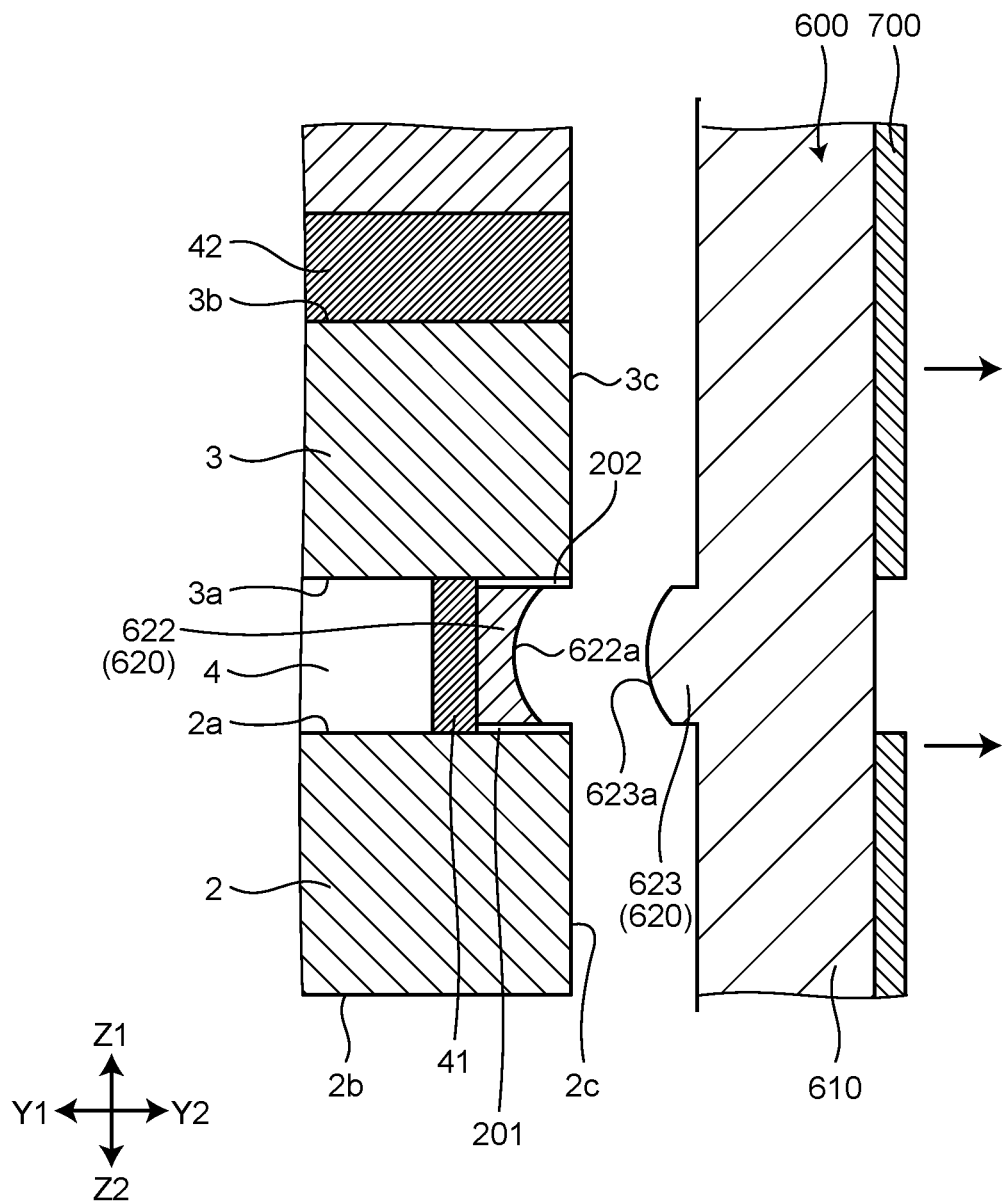
FIG. 15 is a sectional view illustrating a state in which the ultraviolet curable resin and the ultraviolet shielding member are removed from the panel unit.
Figure 16:
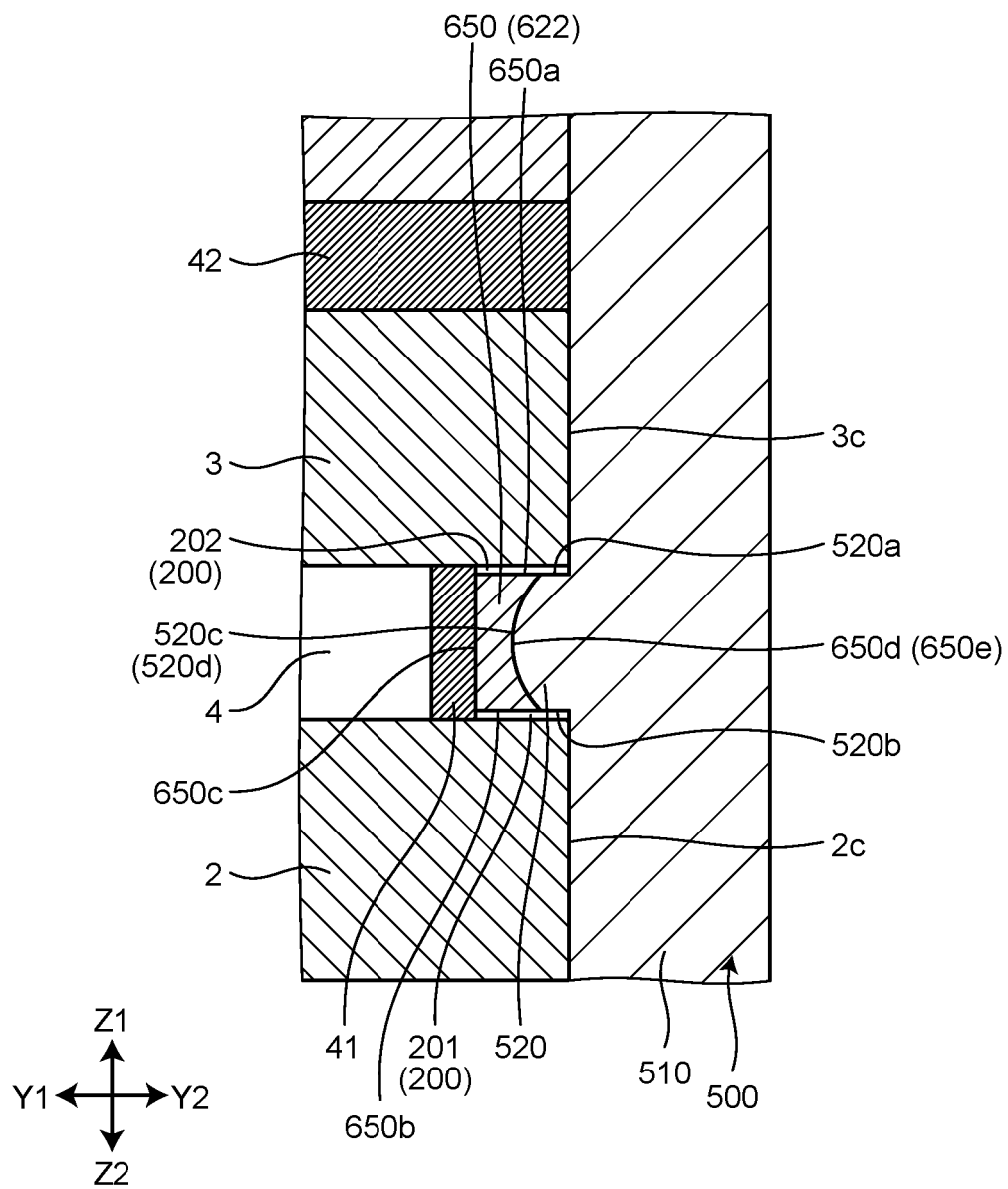
FIG. 16 is a sectional view of a light adjustment device completed by a manufacturing method according to the modification of the first embodiment.

The following describes a modification of the first embodiment. FIG. 14 is a diagram illustrating the modification of the first embodiment and is a sectional view illustrating a state in which the ultraviolet curable resin is irradiated with ultraviolet in the Y direction. FIG. 15 is a sectional view illustrating a state in which the ultraviolet curable resin and the ultraviolet shielding member are removed from the panel unit. FIG. 16 is a sectional view of a light adjustment device completed by the manufacturing method according to the modification of the first embodiment.

In the light adjustment device manufacturing method according to the modification, the position of the ultraviolet shielding member 700 relative to the ultraviolet curable resin 600 is different from that in the first embodiment. The following mainly and briefly describes any difference from the first embodiment.

In the first embodiment, as illustrated in FIG. 11, the ultraviolet shielding member 700 is bonded to the side surface 2*c* of the first substrate 2 and the side surface 3*c* of the second substrate 3 on the Y2 side, and the ultraviolet curable resin 600 is applied on the Y2 side of the ultraviolet shielding member 700. However, in the modification, as illustrated in FIG. 14, the ultraviolet curable resin 600 is applied to the side surface 2*c* of the first substrate 2 and the side surface 3*c* of the second substrate 3 on the Y2 side, and the ultraviolet shielding member 700 is provided on the Y2 side of the ultraviolet curable resin 600. In this manner, the positions of the ultraviolet shielding member 700 and the ultraviolet curable resin 600 are exchanged between the first embodiment and the modification.

Light Adjustment Device Manufacturing Method

The following briefly describes the light adjustment device manufacturing method according to the modification. Similarly to the first embodiment, the light adjustment device manufacturing method according to the modification includes a first step, a second step, a third step, and a fourth step.

In the first step, as illustrated in FIG. 14, the ultraviolet curable resin 600 in a paste form is applied in the Z direction to the side surface 2*c* of the first substrate 2 and the side surface 3*c* of the second substrate 3 on the Y2 side, and the insertion resin portion 620 as part of the ultraviolet curable resin 600 is inserted between the first substrate 2 and the second substrate 3 in each of the light adjustment panels 1.

The ultraviolet shielding member 700, which overlaps the side surface 2*c* of the first substrate 2 and the side surface 3*c* of the second substrate 3 on the Y2 side when the panel unit 110 is viewed in the Y direction, is provided on the Y2 side of the ultraviolet curable resin 600.

In the second step, as illustrated in FIG. 14, the ultraviolet curable resin 600 is irradiated with ultraviolet UV from the Y2 side to cure the entire ultraviolet curable resin 600 including the insertion resin portion 620.

In the third step, as illustrated in FIG. 15, when the ultraviolet curable resin 600 and the ultraviolet shielding member 700 are removed from the panel unit 110 toward the Y2 side as illustrated with arrows, the insertion resin portion 620 is separated into the remaining part 622 and the inserted resin body 623 at the separation boundary 621. As a result, the remaining part 622 remains in the panel unit 110 and becomes the sealing member 650.

In the fourth step, as illustrated in FIG. 16, the conductive member 500 is provided in the Z direction at the first site 120 of the panel unit 110, the distal end 520*d* of the insertion portion 520 as part of the conductive member 500 is brought into contact with the sealing member 650 between the first substrate 2 and the second substrate 3 in each of the light adjustment panels 1, and the insertion portion 520 is electrically coupled to the corresponding coupling terminal 200.

As described above, the light adjustment device 100 according to the first embodiment includes: the panel unit 110 in which a plurality of light adjustment panels 1 are stacked in the Z direction (first direction), each of the light adjustment panels 1 including the first substrate 2 and the second substrate 3, the first substrate 2 including the first terminal 201, the second substrate 3 overlapping the first substrate 2 and including the second terminal 202; the conductive member 500 provided at an end part of the panel unit 110 in the Y direction (second direction) intersecting the Z direction, the conductive member 500 extending in the Z direction; and the sealing member 650 disposed between the first substrate 2 and the second substrate 3 in each of the light adjustment panels 1 and overlapping a coupling terminal 200 including the first terminal 201 and the second terminal 202 when viewed in the Z direction. The conductive member 500 includes the body portion 510 continuously extending in the Z direction, and the insertion portion 520 protruding from the body portion 510 in the Y direction, inserted between the first substrate 2 and the second substrate 3 in each of the light adjustment panels 1, and electrically coupled to the coupling terminal 200, and the distal end 520*d* of the insertion portion 520 contacts the sealing member 650.

As described above, in Japanese Patent Application Laid-open Publication No. 2004-333567, a terminal of a first substrate and a terminal of a second substrate in one light adjustment panel are each coupled to one external coupling wire, and accordingly, a large number of the external coupling wires are included in the entire light adjustment device. However, in the present embodiment and the modification, only four external coupling wires in total need to be each coupled to the one conductive member 500, and thus the number of external coupling wires can be reduced.

Furthermore, in a case where no sealing member 650 is provided, the insertion portion 520 enters too deep between the first substrate 2 and the second substrate 3 in each of the light adjustment panels 1 and the length of the insertion portion 520 increases. In this case, a halfway part of the insertion portion 520 potentially breaks.

However, in the present embodiment and the modification, the sealing member 650 is provided between the first substrate 2 and the second substrate 3 in each of the light adjustment panels 1 and the distal end 520d of the insertion portion 520 of the conductive member 500 contacts the sealing member 650. Accordingly, the insertion portion 520 is prevented from entering too deep between the first substrate 2 and the second substrate 3, which would lead to a too long length of the insertion portion 520 otherwise. Accordingly, it is possible to prevent break of the halfway part of the insertion portion 520, thereby increasing the reliability of electric coupling between the conductive member 500 and a terminal.

The light adjustment device manufacturing method includes: a first step of providing the ultraviolet curable resin 600 and the ultraviolet shielding member 700 in the Z direction at the first site 120, and inserting the insertion resin portion 620 as part of the ultraviolet curable resin 600 between the first substrate 2 and the second substrate 3 in each of the light adjustment panels 1, the ultraviolet shielding member 700 overlapping the first substrate 2 and the second substrate 3 when viewed in the Y direction; a second step of irradiating, after the first step, the ultraviolet curable resin 600 with ultraviolet UV in the Y direction to cure the ultraviolet curable resin 600; a third step of removing, after the second step, the ultraviolet curable resin 600 and the ultraviolet shielding member 700 from the panel unit 110 while part of the insertion resin portion 620 on the distal end side is left as the sealing member 650; and a fourth step of providing, after the third step, the conductive member 500 in the Z direction at the first site 120 of the panel unit 110, bringing the distal end 520d of the insertion portion 520 as part of the conductive member 500 into contact with the sealing member 650 between the first substrate 2 and the second substrate 3 in each of the light adjustment panels 1, and electrically coupling the insertion portion 520 to the coupling terminal 200.

Since the sealing member 650 is provided between the first substrate 2 and the second substrate 3 in each of the light adjustment panels 1, the insertion portion 520 is prevented from entering too deep, which would lead to a too long length of the insertion portion 520 otherwise.

The sealing member 650 can be formed by inserting the insertion resin portion 620 as part of the ultraviolet curable resin 600 between the first substrate 2 and the second substrate 3 and irradiating the ultraviolet curable resin 600 with ultraviolet UV in the Y direction. The sealing member 650 can be formed by such a simple method.

Second Embodiment

Figure 17:
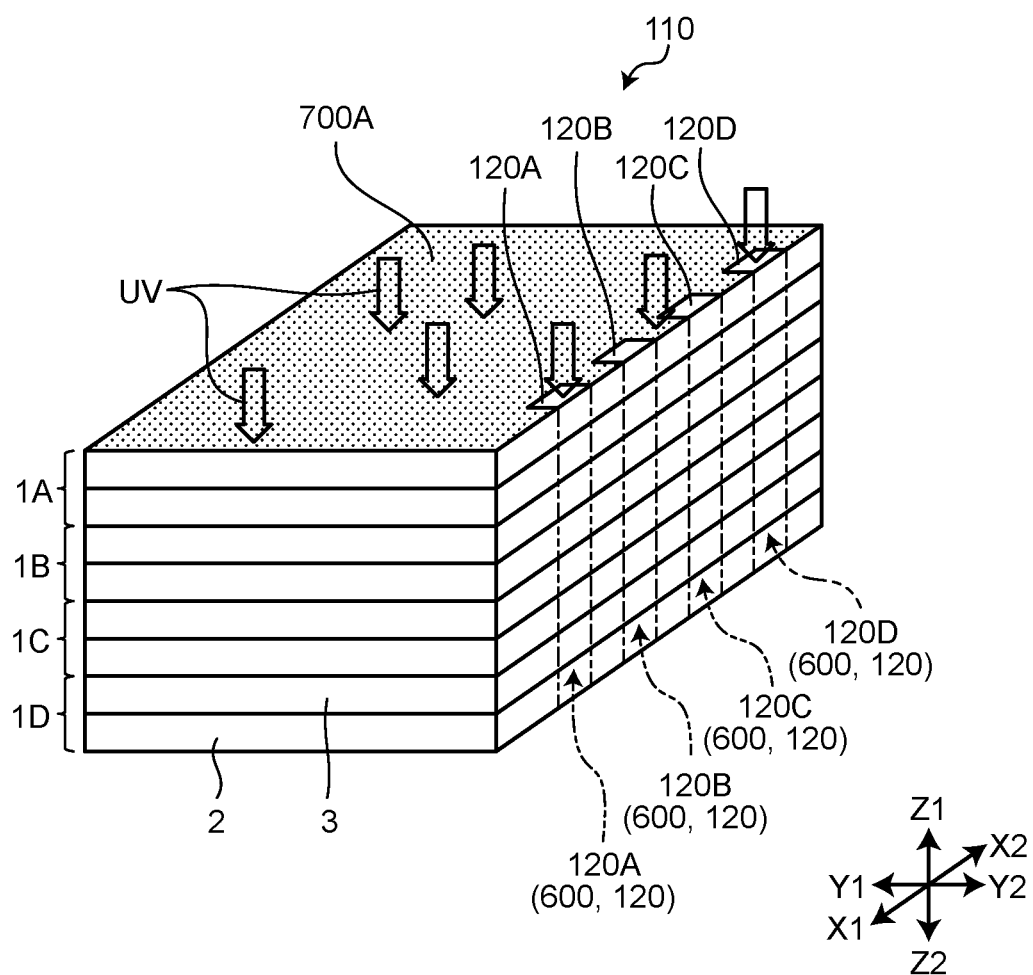
FIG. 17 is a perspective view illustrating a state in which the panel unit is irradiated with ultraviolet in a Z direction in a second embodiment.
Figure 18:
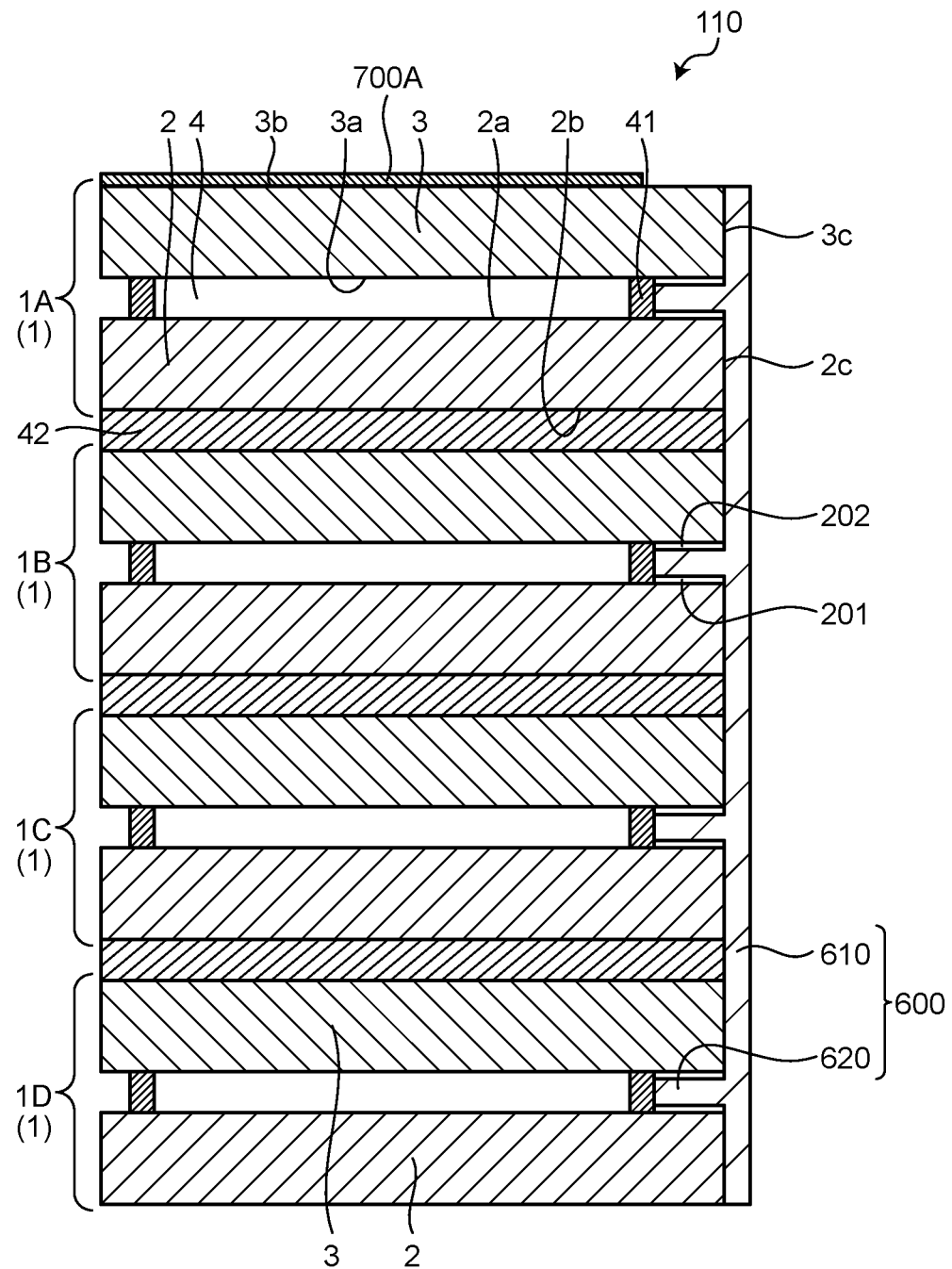
FIG. 18 is a sectional view of the panel unit provided with the ultraviolet curable resin and the ultraviolet shielding member.
Figure 19:
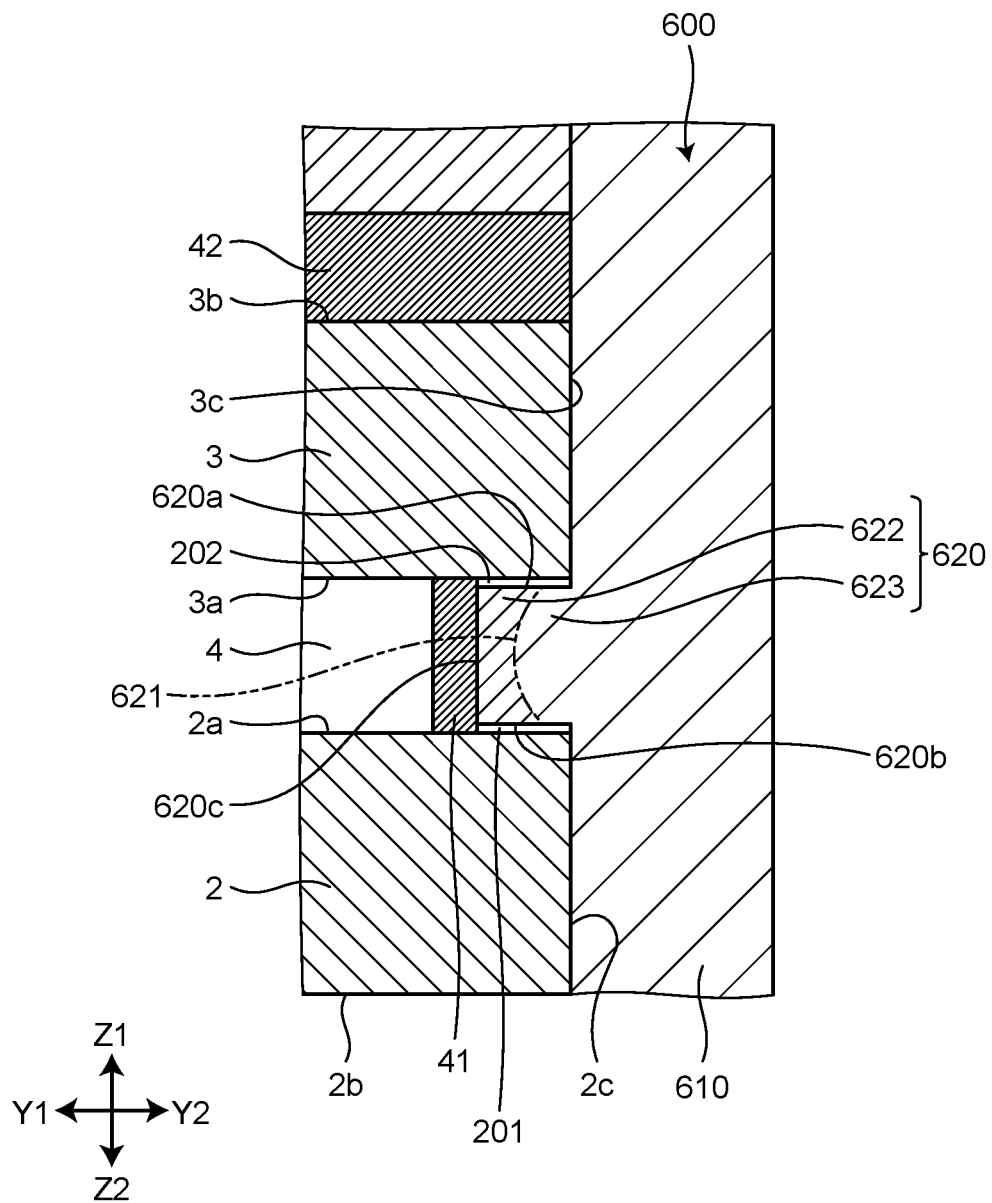
FIG. 19 is an enlarged view of part of FIG. 18.
Figure 20:
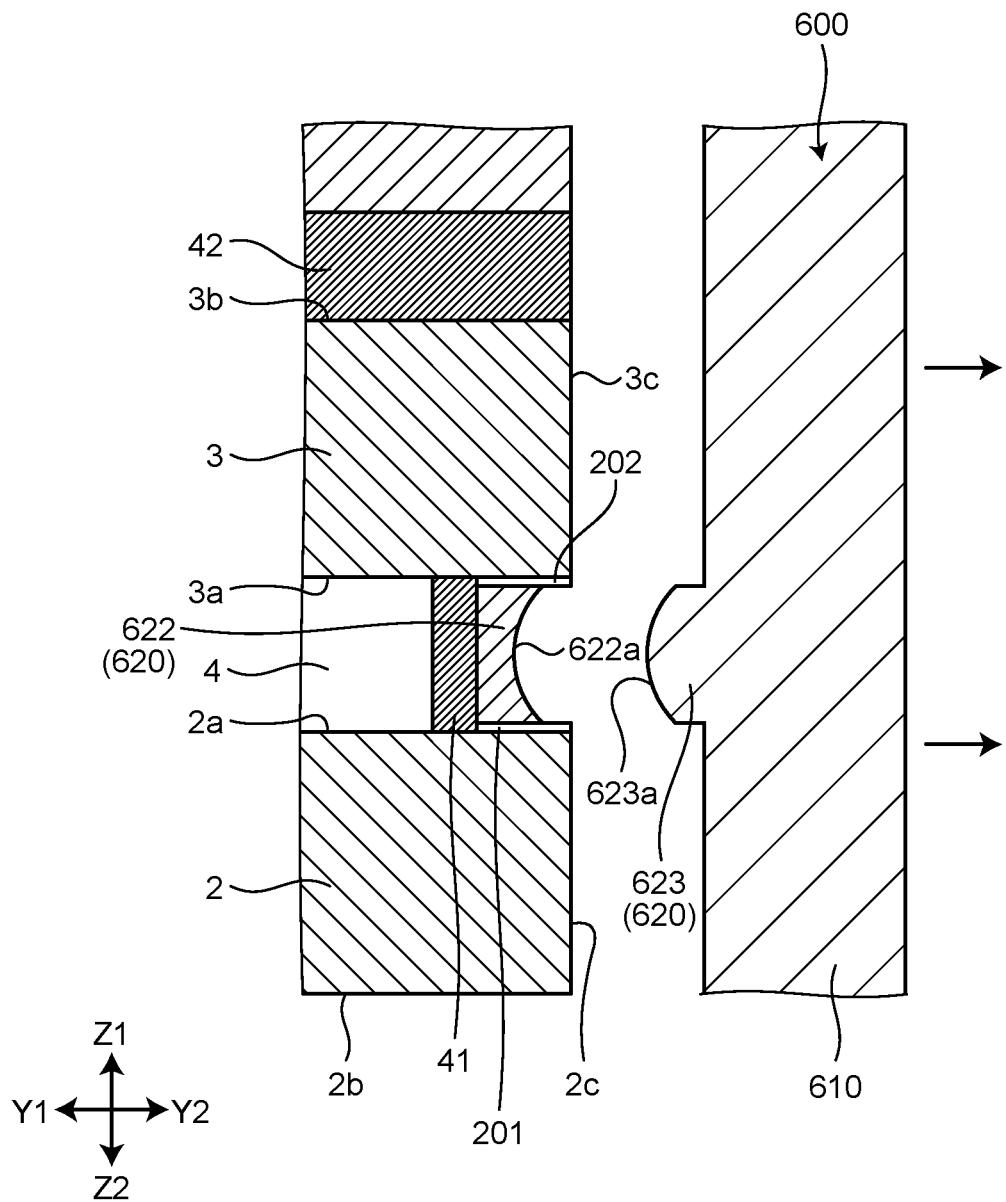
FIG. 20 is a sectional view illustrating a state in which the ultraviolet curable resin is removed from the panel unit.
Figure 21:
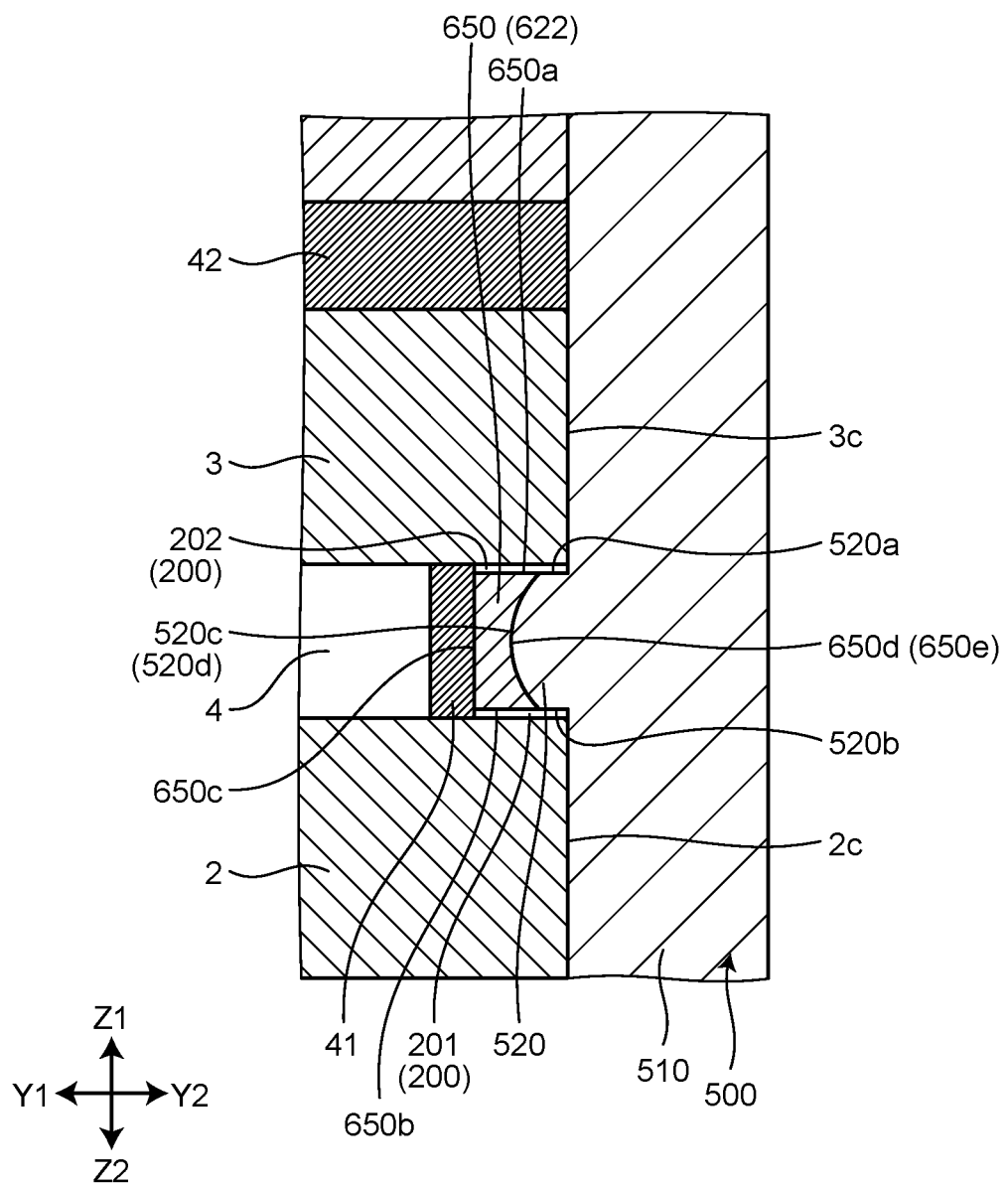
FIG. 21 is a sectional view of a light adjustment device completed by a manufacturing method according to the second embodiment.

The following describes a light adjustment device manufacturing method according to a second embodiment. FIG. 17 is a perspective view illustrating a state in which the panel unit is irradiated with ultraviolet in the Z direction in the second embodiment. FIG. 18 is a sectional view of the panel unit provided with the ultraviolet curable resin and the ultraviolet shielding member. FIG. 19 is an enlarged view of part of FIG. 18. FIG. 20 is a sectional view illustrating a state in which the ultraviolet curable resin is removed from the panel unit. FIG. 21 is a sectional view of a light adjustment device completed by the manufacturing method according to the second embodiment.

In the second embodiment, as illustrated in FIG. 17, an ultraviolet shielding member 700A is bonded to the upper surface (end face on the Z1 side) of the panel unit 110, and the ultraviolet curable resin 600 is applied to the first sites 120. In this manner, the positions of the ultraviolet shielding member 700A and the ultraviolet curable resin 600 are different between the first embodiment and the second embodiment. The ultraviolet shielding member 700A is a sheet member having an ultraviolet UV shielding ratio equal to or larger than the first shielding ratio.

Light Adjustment Device Manufacturing Method

The following briefly describes the light adjustment device manufacturing method according to the second embodiment. Similarly to the first embodiment, the light adjustment device manufacturing method according to the second embodiment includes a first step, a second step, a third step, and a fourth step.

In the first step, as illustrated in FIGS. 17 and 18, the ultraviolet shielding member 700A is bonded to the upper surface (end face on the Z1 side) of the panel unit 110. The ultraviolet shielding member 700A shields the other part than the first site 120. In this manner, the ultraviolet shielding member 700A is provided at an end part of the panel unit 110 in the Z direction in a state of not overlapping the first site 120 when viewed in the Z direction. In addition, the ultraviolet curable resin 600 in a paste form is applied in the Z direction to the side surface 2c of the first substrate 2 and the side surface 3c of the second substrate 3 on the Y2 side, and the insertion resin portion 620 as part of the ultraviolet curable resin 600 is inserted between the first substrate 2 and the second substrate 3 in each of the light adjustment panels 1 as illustrated in FIG. 19.

In the second step, as illustrated in FIG. 17, the ultraviolet curable resin 600 is irradiated with ultraviolet UV from the Z1 side to cure the ultraviolet curable resin 600. Since the ultraviolet shielding member 700A shields the other part than the first site 120, the first site 120 is irradiated with ultraviolet UV from the Z1 side. Accordingly, the direction in which the panel unit 110 is irradiated with ultraviolet UV is different from that in the first embodiment.

In the third step, as illustrated in FIGS. 19 and 20, the ultraviolet curable resin 600 is removed from the panel unit 110 while part of the insertion resin portion 620 on the distal end side is left as the sealing member 650.

In the fourth step, as illustrated in FIG. 21, the conductive member 500 is provided in the Z direction at the first site 120 of the panel unit 110, the distal end 520d of the insertion portion 520 as part of the conductive member 500 is brought into contact with the sealing member 650 between the first substrate 2 and the second substrate 3 in each of the light adjustment panels 1, and the insertion portion 520 is electrically coupled to the corresponding coupling terminal 200.

As described above, the light adjustment device manufacturing method according to the second embodiment includes: a first step of providing the ultraviolet shielding member 700A at a site at the end part of the panel unit 110 in the Z direction, the site not overlapping the first site 120 when viewed in the Z direction, providing the ultraviolet curable resin 600 in the Z direction at the first site 120 of the panel unit 110, and inserting the insertion resin portion 620 as part of the ultraviolet curable resin 600 between the first substrate 2 and the second substrate 3 in each of the light adjustment panels 1; a second step of irradiating, after the first step, the ultraviolet curable resin 600 with ultraviolet UV in the Z direction to cure the ultraviolet curable resin 600; a third step of removing, after the second step, the ultraviolet curable resin 600 from the panel unit 110 while part of the insertion resin portion 620 on the distal end side is left as the sealing member 650; and a fourth step of providing, after the third step, the conductive member 500 in the Z direction at the first site 120 of the panel unit 110, bringing the distal end 520d of the insertion portion 520 as part of the conductive member 500 into contact with the sealing member 650 between the first substrate 2 and the second substrate 3 in each of the light adjustment panels 1, and electrically coupling the insertion portion 520 to the first terminal 201 and the second terminal 202.

In the first embodiment, the ultraviolet curable resin 600 is irradiated with ultraviolet UV in the Y direction. Specifically, as illustrated in FIG. 11, the body portion 610 of the ultraviolet curable resin 600 is irradiated with ultraviolet UV from the Y2 side. The insertion resin portion 620 is positioned on the Y1 side of the body portion 610. In other words, the insertion resin portion 620 is positioned on a side opposite a side where the body portion 610 is irradiated with ultraviolet UV.

However, in the second embodiment, the ultraviolet shielding member 700A is provided at the end part of the panel unit 110 in the Z direction, and the ultraviolet curable resin 600 is irradiated with ultraviolet UV in the Z direction. In other words, the insertion resin portion 620 is directly irradiated with ultraviolet UV from above. Thus, the insertion resin portion 620 can be cured harder, and accordingly, the sealing member 650 can be more easily formed.

Third Embodiment

Figure 22:
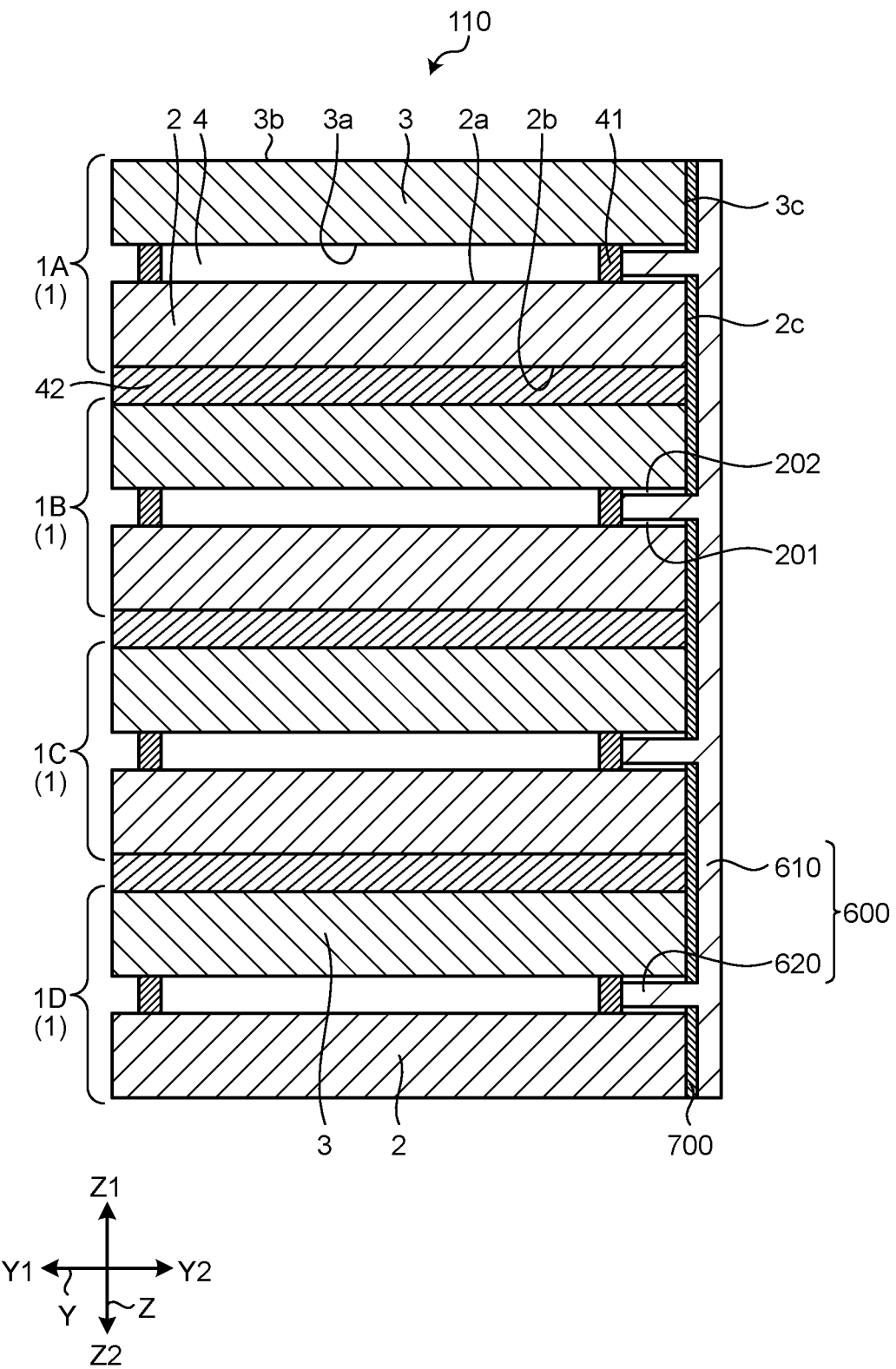
FIG. 22 is a sectional view of the panel unit provided with the ultraviolet curable resin and the ultraviolet shielding member in a third embodiment.
Figure 23:
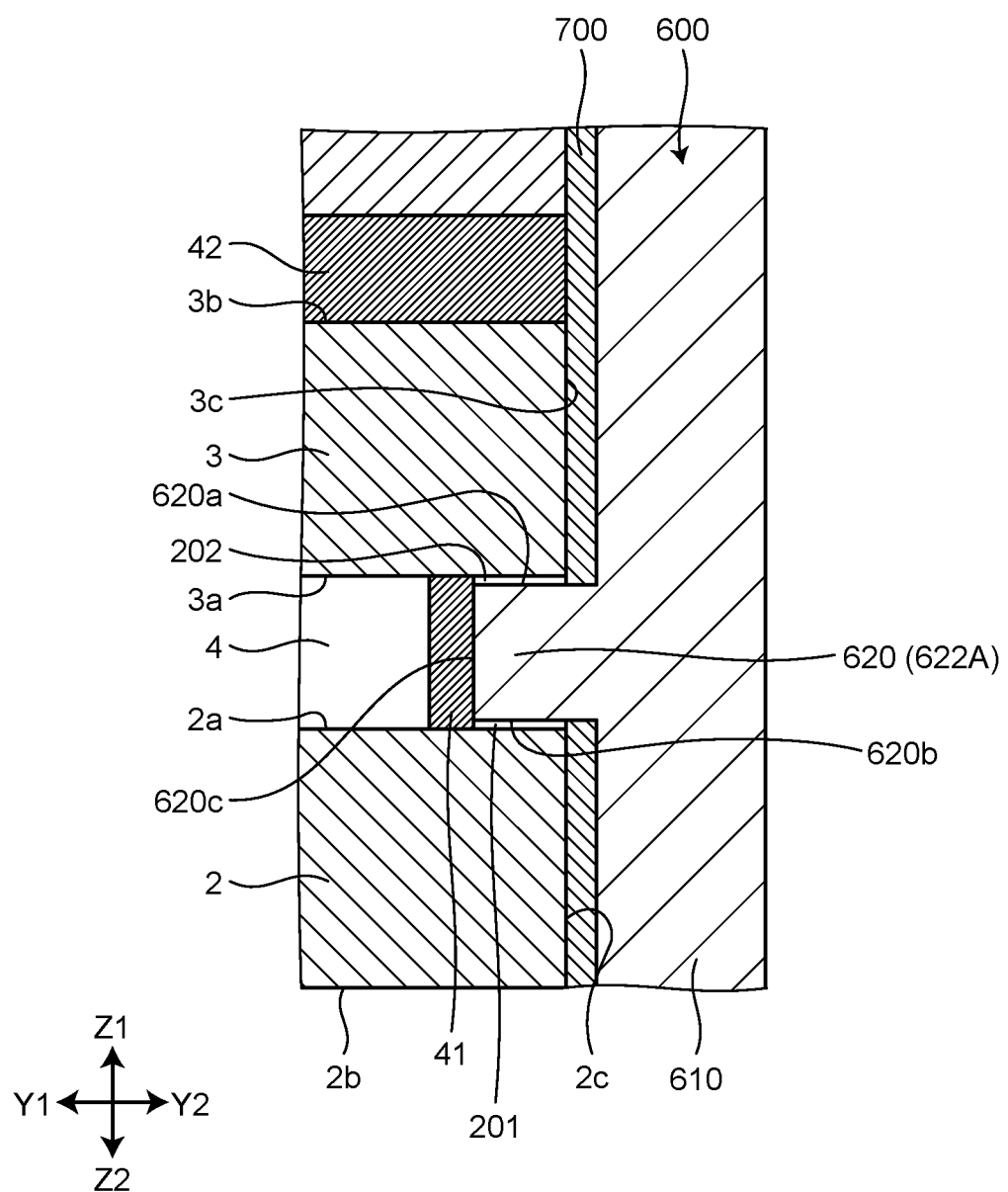
FIG. 23 is an enlarged view of part of FIG. 22.
Figure 24:
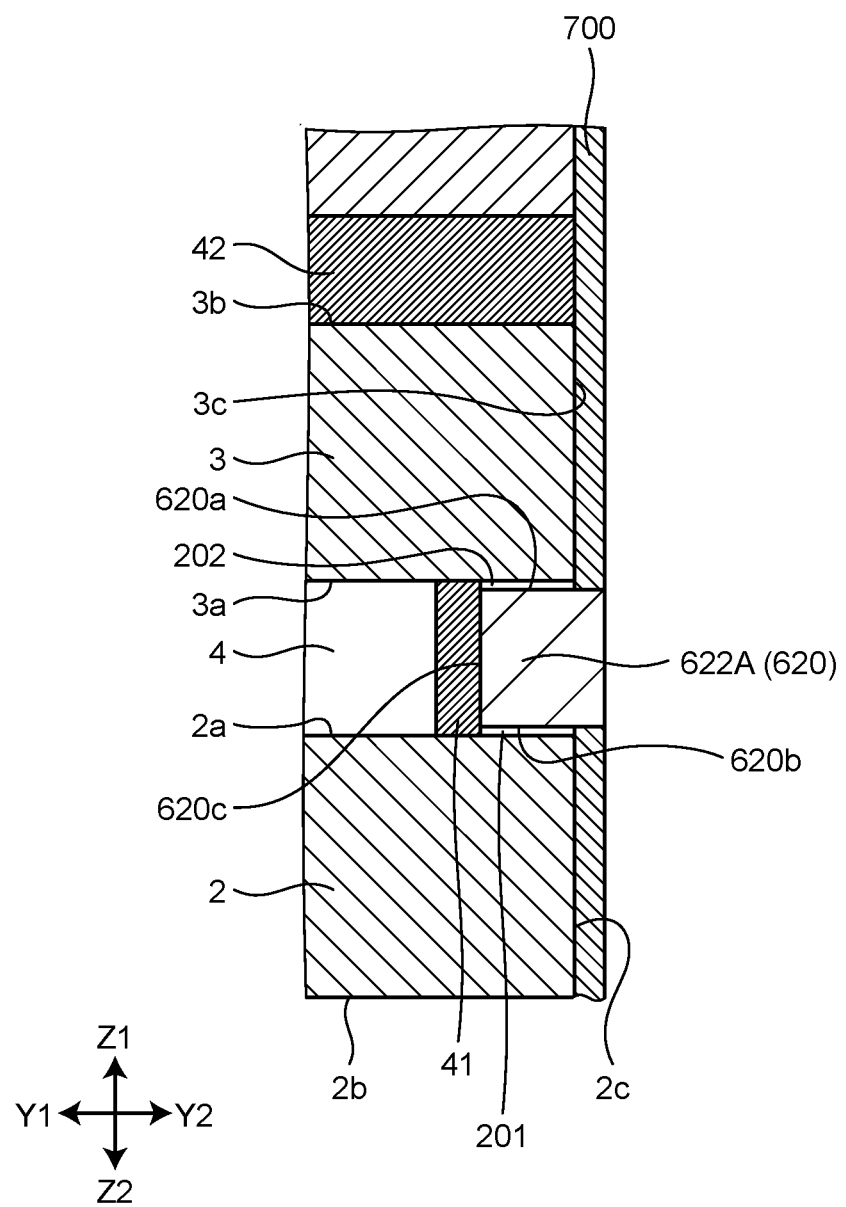
FIG. 24 is a sectional view illustrating a state in which part of the ultraviolet curable resin on the outside of the ultraviolet shielding member in the Y direction is removed.
Figure 25:
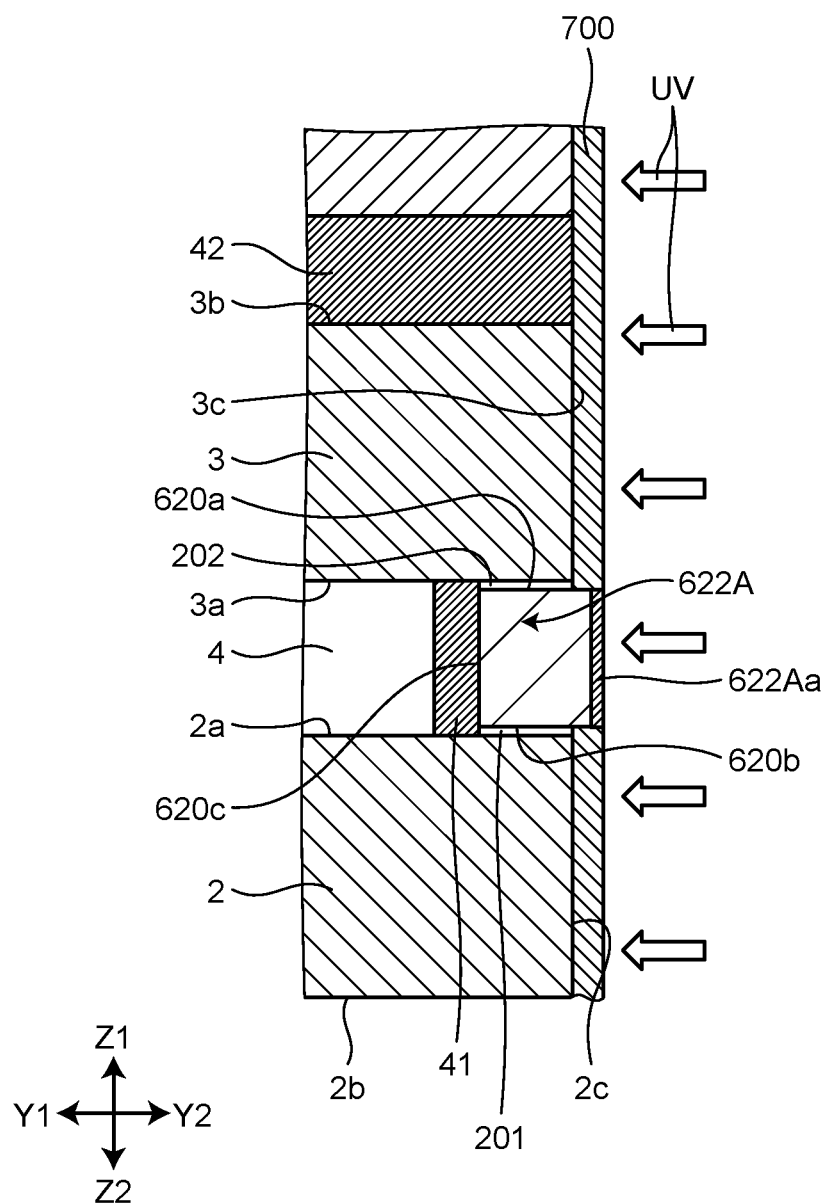
FIG. 25 is a sectional view illustrating a state in which the side surface of the panel unit in FIG. 24 is irradiated with ultraviolet in the Y direction.
Figure 26:
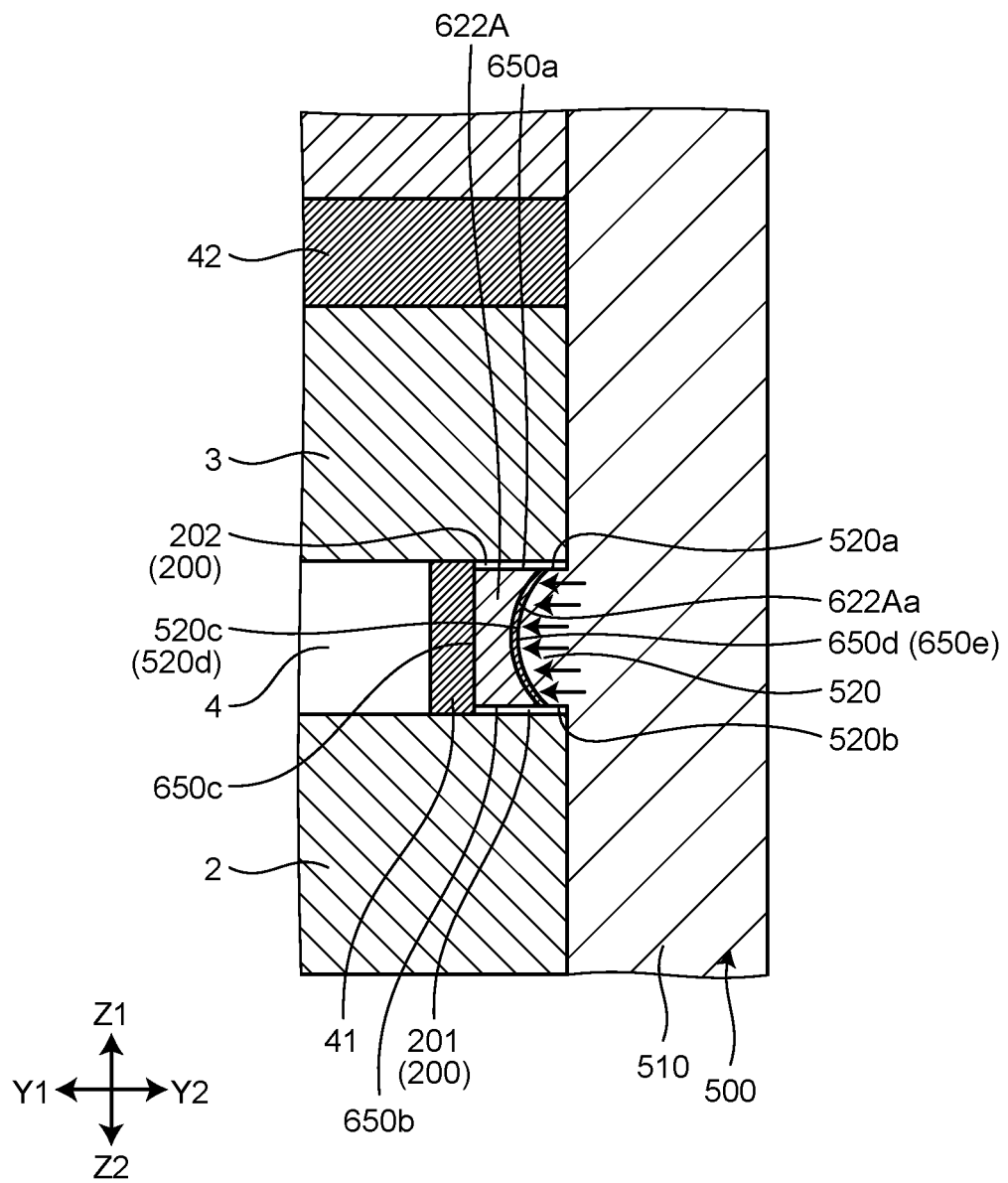
FIG. 26 is a sectional view illustrating a state in which a conductive member is provided on the side surface of the panel unit.

The following describes a light adjustment device manufacturing method according to a third embodiment. FIG. 22 is a sectional view of the panel unit provided with the ultraviolet curable resin and the ultraviolet shielding member in the third embodiment. FIG. 23 is an enlarged view of part of FIG. 22. FIG. 24 is a sectional view illustrating a state in which part of the ultraviolet curable resin on the outside of the ultraviolet shielding member in the Y direction is removed. FIG. 25 is a sectional view illustrating a state in which the side surface of the panel unit in FIG. 24 is irradiated with ultraviolet in the Y direction. FIG. 26 is a sectional view illustrating a state in which the conductive member is provided on the side surface of the panel unit.

The light adjustment device manufacturing method according to the third embodiment includes a first step, a second step, a third step, a fourth step, and a fifth step. The following description is focused on any difference from the above-described first and second embodiments.

Light Adjustment Device Manufacturing Method

In the first step, similarly to the first embodiment, the ultraviolet shielding member 700 is provided on end faces of the first substrate 2 and the second substrate 3 in the Y direction as illustrated in FIGS. 22 and 23.

In the second step, as illustrated in FIGS. 22 and 23, the ultraviolet curable resin 600 is provided on the ultraviolet shielding member 700, and the insertion resin portion 620 as part of the ultraviolet curable resin 600 is inserted between the first substrate 2 and the second substrate 3 in each of the light adjustment panels 1.

In the third step, as illustrated in FIG. 24, part of the ultraviolet curable resin 600 on the Y2 side (outside in the Y direction) of the ultraviolet shielding member 700 is removed. Accordingly, the ultraviolet curable resin 600 is inserted only between the first substrate 2 and the second substrate 3 in each of the light adjustment panels 1.

In the fourth step, as illustrated in FIG. 25, the ultraviolet curable resin 600 is irradiated with ultraviolet UV from the Y2 side to cure a surface layer part 622Aa of the insertion resin portion 620 on the Y2 side. In the third embodiment, the intensity of ultraviolet UV is set to be lower than in the first embodiment. With this configuration, although the entire insertion resin portion 620 is cured in the first embodiment, only the surface layer part 622Aa of the insertion resin portion 620 is cured in the third embodiment since the ultraviolet intensity is lower than in the first embodiment.

In the fifth step, as illustrated in FIG. 26, the conductive member 500 is provided in the Z direction at the end part of the panel unit 110 in the Y direction. Then, part of the conductive member 500 is inserted between the first substrate 2 and the second substrate 3 in each of the light adjustment panels 1, and the distal end 520d of the insertion portion 520 as the inserted part is pressed against the surface layer part 622Aa of the insertion resin portion 620. With this procedure, the insertion resin portion 620 is concaved, and thus formed at the sealing member 650.

As described above, the light adjustment device manufacturing method according to the third embodiment includes: a first step of providing the ultraviolet curable resin 600 and the ultraviolet shielding member 700 in the Z direction at the first site 120, the ultraviolet shielding member 700 overlapping the first substrate 2 and the second substrate 3 when viewed in the Y direction, and inserting the insertion resin portion 620 as part of the ultraviolet curable resin 600 between the first substrate 2 and the second substrate 3 in each of the light adjustment panels 1; a second step of providing, after the first step, the ultraviolet curable resin 600 on the ultraviolet shielding member 700, and inserting the insertion resin portion 620 as part of the ultraviolet curable resin 600 between the first substrate 2 and the second substrate 3 in each of the light adjustment panels 1; a third step of removing, after the second step, part of the ultraviolet curable resin 600 on the outside of the ultraviolet shielding member 700 in the Y direction; a fourth step of irradiating, after the third step, the ultraviolet curable resin 600 with ultraviolet UV in the Y direction to cure the surface layer part 622Aa of the insertion resin portion 620 on the outside in the Y direction; and a fifth step of forming a remaining part 622A at the sealing member 650, after the fourth step, by providing the conductive member 500 in the Z direction at the end part of the panel unit 110 in the Y direction, inserting part of the conductive member 500 between the first substrate 2 and the second substrate 3 in each of the light adjustment panels 1, and pressing the distal end 520d of the insertion portion 520 as the inserted part against the surface layer part 622Aa of the remaining part 622A of the insertion resin portion 620 to concave the remaining part 622A.

In this manner, in the light adjustment device manufacturing method according to the third embodiment, the remaining part 622A is formed at the sealing member 650 by curing the surface layer part 622Aa of the insertion resin portion 620 on the outside in the Y direction and pressing the distal end 520d of the insertion portion 520 against the surface layer part 622Aa of the remaining part 622A to concave the insertion resin portion 620.

In the first and second embodiments, since part of the insertion resin portion 620 on the distal end side is broken to form the sealing member 650, variation potentially occurs to the broken site of the insertion resin portion 620 and also to the size of the sealing member 650. However, in the third embodiment, since the insertion resin portion 620 is not broken but the distal end 520d of the insertion portion 520 is pressed against the remaining part 622A of the insertion resin portion 620 to concave the remaining part 622A, variation is unlikely to occur to the size of the sealing member 650.

What is claimed is:

1. A light adjustment device comprising:
a panel unit in which a plurality of light adjustment panels are stacked in a first direction, each of the light adjustment panels including a first substrate and a second substrate, the first substrate including a first terminal, the second substrate overlapping the first substrate and including a second terminal;
a conductive member provided at an end part of the panel unit in a second direction intersecting the first direction, the conductive member extending in the first direction; and
a sealing member disposed between the first substrate and the second substrate in each of the light adjustment panels and overlapping a coupling terminal including the first terminal and the second terminal when viewed in the first direction, wherein
the conductive member includes
a body portion continuously extending in the first direction, and
an insertion portion protruding from the body portion in the second direction, inserted between the first substrate and the second substrate in each of the light adjustment panels, and electrically coupled to the coupling terminal, and
a distal end of the insertion portion contacts the sealing member.

2. A light adjustment device manufacturing method of manufacturing a light adjustment device by using an ultraviolet shielding member having an ultraviolet shielding ratio equal to or higher than a first shielding ratio, wherein the first shielding ratio is preferably 90% or higher, and an ultraviolet curable resin that is cured through ultraviolet irradiation, the light adjustment device including: a panel unit in which a plurality of light adjustment panels are stacked in a first direction, each of the light adjustment panels including a first substrate and a second substrate, the first substrate including a first terminal, the second substrate overlapping the first substrate and including a second terminal; a conductive member provided at an end part of the panel unit in a second direction intersecting the first direction, the conductive member extending in the first direction; and a sealing member disposed between the first substrate and the second substrate in each of the light adjustment panels and overlapping a coupling terminal including the first terminal and the second terminal when viewed in the first direction, the conductive member including a body portion continuously extending in the first direction and an insertion portion protruding from the body portion in the second direction, inserted between the first substrate and the second substrate in each of the light adjustment panels, and electrically coupled to the coupling terminal, a distal end of the insertion portion contacting the sealing member,
the light adjustment device manufacturing method comprising: when a first site is a site at an end part of the panel unit in the second direction, the first site overlapping the coupling terminal when viewed in the first direction,
a first step of providing the ultraviolet curable resin and the ultraviolet shielding member in the first direction at the first site, the ultraviolet shielding member overlapping the first substrate and the second substrate when viewed in the second direction, and inserting an insertion resin portion as part of the ultraviolet curable resin between the first substrate and the second substrate in each of the light adjustment panels;
a second step of irradiating, after the first step, the ultraviolet curable resin with ultraviolet in the second direction to cure the ultraviolet curable resin;
a third step of removing, after the second step, the ultraviolet curable resin and the ultraviolet shielding member from the panel unit while part of the insertion resin portion on a distal end side is left as the sealing member; and
a fourth step of providing, after the third step, the conductive member in the first direction at the first site of the panel unit, bringing the distal end of the insertion portion as part of the conductive member into contact with the sealing member between the first substrate and the second substrate in each of the light adjustment panels, and electrically coupling the insertion portion to the coupling terminal.

3. A light adjustment device manufacturing method of manufacturing a light adjustment device by using an ultraviolet shielding member having an ultraviolet shielding ratio equal to or higher than a first shielding ratio, wherein the first shielding ratio is preferably 90% or higher, and an ultraviolet curable resin that is cured through ultraviolet irradiation, the light adjustment device including: a panel unit in which a plurality of light adjustment panels are stacked in a first direction, each of the light adjustment panels including a first substrate and a second substrate, the first substrate including a first terminal, the second substrate overlapping the first substrate and including a second terminal; a conductive member provided at an end part of the panel unit in a second direction intersecting the first direction, the conductive member extending in the first direction; and a sealing member disposed between the first substrate and the second substrate in each of the light adjustment panels and overlapping a coupling terminal including the first terminal and the second terminal when viewed in the first direction, the conductive member including a body portion continuously extending in the first direction and an insertion portion protruding from the body portion in the second direction, inserted between the first substrate and the second substrate in each of the light adjustment panels, and electrically coupled to the coupling terminal, a distal end of the insertion portion contacting the sealing member,
the light adjustment device manufacturing method comprising, when a first site is a site at an end part of the panel unit in the second direction: the first site overlapping the coupling terminal when viewed in the first direction,
a first step of providing the ultraviolet shielding member at an end part of the panel unit in the first direction in a state of not overlapping the first site when viewed in the first direction, providing the ultraviolet curable resin in the first direction at the first site of the panel unit, and inserting an insertion resin portion as part of the ultraviolet curable resin between the first substrate and the second substrate in each of the light adjustment panels;
a second step of irradiating, after the first step, the ultraviolet curable resin with ultraviolet in the first direction to cure the ultraviolet curable resin;
a third step of removing, after the second step, the ultraviolet curable resin from the panel unit while part of the insertion resin portion on a distal end side is left as the sealing member; and
a fourth step of providing, after the third step, the conductive member in the first direction at the first site of the panel unit, bringing the distal end of the insertion portion as part of the conductive member into contact with the sealing member between the first substrate and the second substrate in each of the light adjustment panels, and electrically coupling the insertion portion to the first terminal and the second terminal.

* * * * *